US012128686B2

(12) United States Patent
Fujimori et al.

(10) Patent No.: US 12,128,686 B2
(45) Date of Patent: Oct. 29, 2024

(54) LIQUID EJECTING APPARATUS

(71) Applicant: SEIKO EPSON CORPORATION, Tokyo (JP)

(72) Inventors: Ryoji Fujimori, Suwa (JP); Jun Higuchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 122 days.

(21) Appl. No.: 17/816,862

(22) Filed: Aug. 2, 2022

(65) Prior Publication Data

US 2023/0044713 A1 Feb. 9, 2023

(30) Foreign Application Priority Data

Aug. 5, 2021 (JP) ................................ 2021-128819

(51) Int. Cl.
*B41J 2/165* (2006.01)

(52) U.S. Cl.
CPC .... *B41J 2/16535* (2013.01); *B41J 2002/1655* (2013.01)

(58) Field of Classification Search
CPC ............ B41J 2/16535; B41J 2002/1655; B41J 2/16517
See application file for complete search history.

(56) References Cited

U.S. PATENT DOCUMENTS

2020/0207097 A1* 7/2020 Fujioka ................ B41J 2/16517
2021/0107285 A1 4/2021 Kanazawa et al.
2022/0072861 A1* 3/2022 Yamaguchi .......... B41J 2/04553

FOREIGN PATENT DOCUMENTS

JP 2008-238436 A 10/2008
JP 2021-059088 A 4/2021
JP 2021122972 A * 8/2021

* cited by examiner

*Primary Examiner* — Sharon Polk
(74) *Attorney, Agent, or Firm* — WORKMAN NYDEGGER

(57) ABSTRACT

A liquid ejecting apparatus includes a liquid ejecting portion, a strip member, and a supply portion capable of supplying a reaction liquid having a component that cures ink to the strip member, the strip member being provided so as to be able to set a receiving region that receives any one of ink and reaction liquid discharged as waste liquid from a nozzle of the liquid ejecting portion and a contact region that comes into contact with the liquid ejecting portion when any one of ink and reaction liquid is collected, and the supply portion supplies the reaction liquid to a supply region set in the strip member between the contact region and a position farthest from the contact region in the receiving region.

11 Claims, 20 Drawing Sheets

LIQUID EJECTING APPARATUS

The present application is based on, and claims priority from JP Application Serial Number 2021-128819, filed Aug. 5, 2021, the disclosure of which is hereby incorporated by reference herein in its entirety.

BACKGROUND

1. Technical Field

The present disclosure relates to a Liquid ejecting apparatus.

2. Related Art

JP-A-2008-238436 discloses an ink jet type liquid ejecting apparatus including a printing unit, which is an example of a liquid ejecting portion for ejecting ink, which is an example of liquid, from a nozzle, and an absorbing member capable of absorbing ink. In the liquid ejecting apparatus, the printing unit performs flushing to discharge ink, as waste liquid, from a nozzle toward a receiving region of the absorbing member. In addition, the liquid ejecting apparatus causes a region of the absorbing member that has not absorbed the ink to come into contact with the printing unit and absorb the ink from the printing unit.

However, the waste liquid collected in the absorbing member diffuses in the absorbing member. For example, in the absorbing member, there is a concern that when the waste liquid received in the receiving region spreads toward and wets a region to be brought into contact with the printing unit, the region of the absorbing member to which the waste liquid spread and wet will be brought into contact with the printing unit.

SUMMARY

A liquid ejecting apparatus including a liquid ejecting portion configured to perform printing by ejecting liquid from a nozzle to a medium, a sheet-like absorbing member configured to absorb the liquid, and a supply portion configured to supply a reaction liquid having a component for curing the liquid to the absorbing member, wherein the absorbing member is provided to be settable with a receiving region that receives the liquid discharged as waste liquid from the nozzle and a contact region that comes into contact with the liquid ejecting portion when collecting the liquid by coming into contact with the liquid ejecting portion, the supply portion supplies the reaction liquid to a supply region set in the absorbing member between the contact region and a position in the receiving region farthest from the contact region.

DESCRIPTION OF EMBODIMENTS

Figure 1:
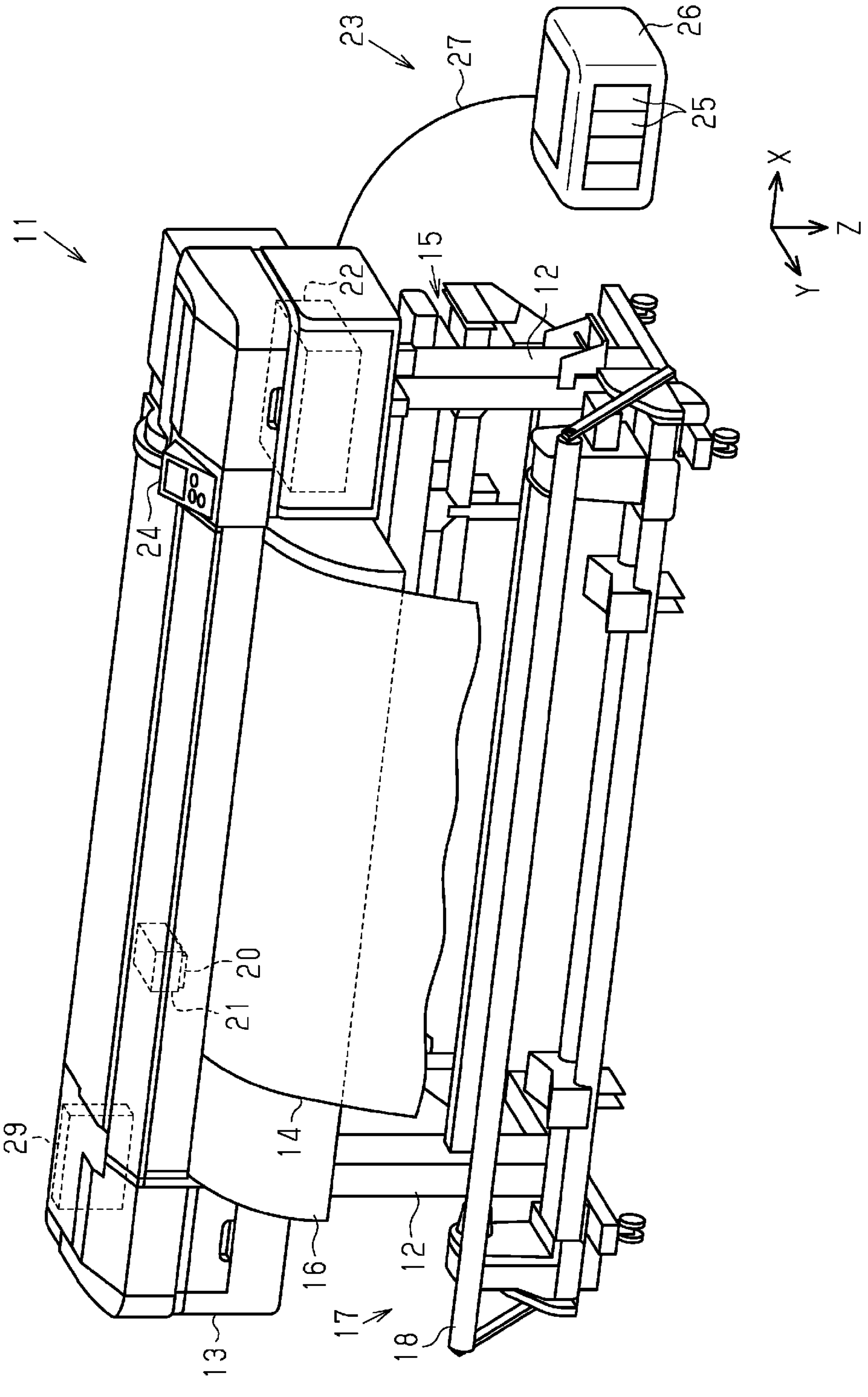
FIG. 1 is a perspective view illustrating a configuration of a liquid ejecting apparatus as an embodiment of the present disclosure.

Hereinafter, the present disclosure will be described based on embodiments. In the drawings, the same members are denoted by the same reference numerals, and redundant descriptions will be omitted. Note that in this specification, the term “same” refers not only to things that are completely the same, but also includes the case where something is the same in consideration of a measurement error, the case where something is the same in consideration of manufacturing variation of a member, and the case where something is the same within a range that does not impair a function. Therefore, for example, “both dimensions are the same” means that the difference between both dimensions is within ±10%, more desirably within ±5%, and particularly desirably within ±3% of one dimension in consideration of measurement errors and manufacturing variations of members.

In each drawing, X, Y, and Z represent three spatial axes orthogonal to each other. In this specification, directions extending along these axes are referred to as an X axis direction, a Y axis direction, and a Z axis direction. In a case where the direction is specified, positive and negative signs are used together for direction notation wherein a positive direction is set as “+”, a negative direction is set as “−”, and the direction in which an arrow in each drawing is directed is set as a + direction, and a direction opposite to the arrow is set as a − direction.

The Z axis direction indicates the gravity direction, the +Z direction indicates the vertical downward direction, and the −Z direction indicates the vertical upward direction. In addition, a plane including the X axis and the Y axis will be described as an X-Y plane, a plane including the X axis and the Z axis will be described as an X-Z plane, and a plane including the Y axis and the Z axis will be described as a Y-Z plane. Further, the X-Y plane is a horizontal plane. Further, the three spatial axes of X, Y, and Z, when not limited to positive or negative directions, are described as the X axis, the Y axis, and the Z axis. In addition, in the following description, a direction along the X axis is also referred to as a width direction X, a direction along the Y axis is also referred to as a depth direction Y, and a direction along the Z axis is also referred to as a gravity direction Z.

1. First Embodiment

The configuration of the liquid ejecting apparatus 11 according to a first embodiment will be described. The liquid ejecting apparatus 11 is, for example, an ink jet printer that performs printing by ejecting ink, which is an example of a liquid, onto a medium such as paper. The liquid ejecting apparatus 11 of the present embodiment performs printing by ejecting ink onto a medium onto which a reaction liquid has been discharged. The reaction liquid contains a component that increases the viscosity of the ink and cures the ink by coming into contact with the ink. The reaction liquid contains a component that, when mixed with the ink, causes the viscosity of the mixed liquid of the ink and the reaction liquid to become higher than the viscosity of the ink, and causes the mixed liquid to cure. The reaction liquid is an example of a liquid. In the following description, any of ink, reaction liquid, ink and reaction liquid, a mixture of ink and reaction liquid, and waste liquid may be referred to as liquid.

As shown in FIG. 1, the liquid ejecting apparatus 11 includes a pair of leg sections 12 and a housing 13 assembled on the legs 12. The liquid ejecting apparatus 11 includes a feeding section 15 that unwinds and feeds a medium 14 wound in a roll shape, a guide section 16 that guides the medium 14 discharged from a housing 13, and a collection section 17 that winds and collects the medium 14. The liquid ejecting apparatus 11 includes a tension applying mechanism 18 that applies tension to the medium 14 collected by the collection section 17.

The liquid ejecting apparatus 11 includes a liquid ejecting portion 20 capable of ejecting liquid, a carriage 21 that moves the liquid ejecting portion 20, and a maintenance unit 22 that performs maintenance of the liquid ejecting portion 20. The liquid ejecting apparatus 11 includes a liquid supply device 23 that supplies liquid to the liquid ejecting portion 20, and an operation panel 24 that is operated by a user. The carriage 21 reciprocates the liquid ejecting portion 20 along the X axis. The liquid ejecting portion 20, while moving, discharges the liquid supplied through the liquid supply device 23, and performs printing on the medium 14.

The liquid supply device 23 includes a mounting section 26 to which are detachably mounted a plurality of liquid containers 25 for storing liquid, and a supply flow path 27 for supplying liquid from the liquid containers 25 mounted to the mounting section 26 to the liquid ejecting portion 20.

The liquid ejecting apparatus 11 includes a control section 29 that controls the operation of the liquid ejecting apparatus 11. The control section 29 includes, for example, a CPU, a memory, and the like. The control section 29 controls the liquid ejecting portion 20, the liquid supply device 23, the maintenance unit 22, and the like by using the CPU to execute a program stored in the memory.

Figure 2:
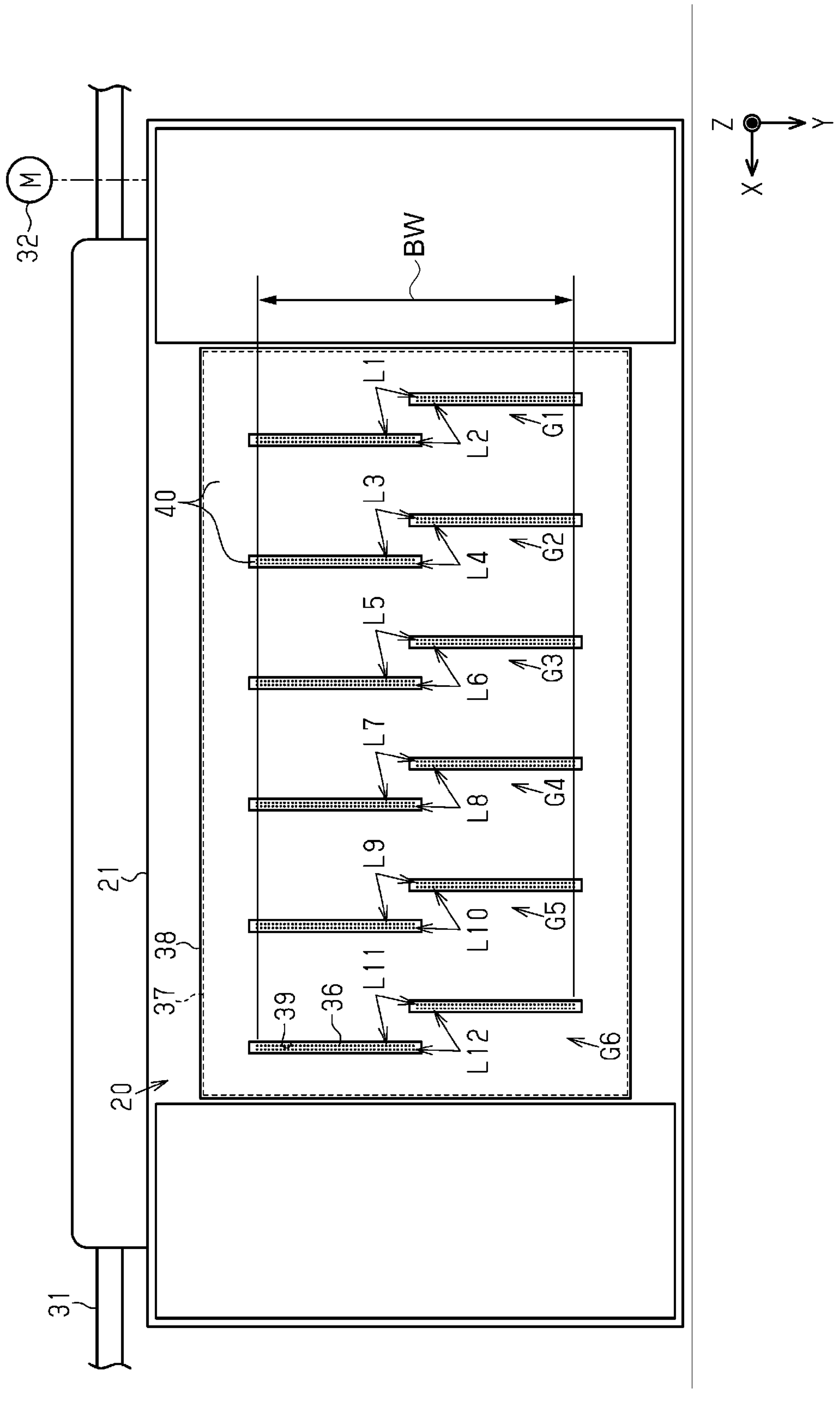
FIG. 2 is a schematic bottom view of a liquid ejecting portion and a carriage.

As shown in FIG. 2, the liquid ejecting apparatus 11 includes a guide shaft 31 that supports the carriage 21, and a carriage motor 32 that moves the carriage 21. The guide shaft 31 extends in the width direction X. The control section 29 controls driving of the carriage motor 32 to reciprocate the carriage 21 and the liquid ejecting portion 20 along the guide shaft 31.

The liquid ejecting portion 20 includes a nozzle forming member 37 in which a plurality of nozzles 36 are formed, and a cover member 38 that covers part of the nozzle forming member 37. The cover member 38 is made of a metal such as stainless steel. The cover member 38 is formed with a plurality of through holes 39 penetrating the cover member 38 in the gravity direction Z. The cover member 38 covers a surface of the nozzle forming member 37 on which the nozzles 36 are formed so that the nozzles 36 are exposed from the through holes 39. The nozzle face 40 is formed including the nozzle forming member 37 and the cover member 38. Specifically, the nozzle face 40 is constituted by the nozzle forming member 37 exposed from the through hole 39 and the cover member 38, and nozzles 36 for ejecting a liquid are formed.

In the liquid ejecting portion 20, a large number of openings of nozzles 36 that discharge liquid are arranged at certain intervals in one direction. The plurality of nozzles 36 constitute a nozzle array. In the present embodiment, the openings of the nozzles 36 are arranged in the depth direction Y and constitute a first nozzle array L1 to a twelfth nozzle array L12. The nozzles 36 constituting one nozzle array discharge the same type of liquid. Among the nozzles 36 constituting one nozzle array, a nozzle 36 located at the back in the depth direction Y and a nozzle 36 located at the front in the depth direction Y are formed such that their positions are shifted in the width direction X.

The first nozzle array L1 to the twelfth nozzle array L12 are arranged with two nozzle arrays each close to each other in the widthwise direction X. In the present embodiment, two nozzle arrays arranged close to each other are referred to as a nozzle group. In the liquid ejecting portion 20, a first nozzle group G1 to a sixth nozzle group G6 are arranged at a certain interval in the width direction X. In the present embodiment, the dimensions of the first nozzle group G1 to the sixth nozzle group G6 in the depth direction Y are the same. The first nozzle group G1 to the sixth nozzle group G6 are provided in a region BW of the nozzle face 40.

Specifically, the first nozzle group G1 includes a first nozzle array L1 that discharges magenta ink and a second nozzle array L2 that discharges yellow ink. The second nozzle group G2 includes a third nozzle array L3 that discharges cyan ink and a fourth nozzle array L4 that discharges black ink. The third nozzle group G3 includes a fifth nozzle array L5 that discharges light cyan ink and a sixth nozzle array L6 that discharges light magenta ink.

The fourth nozzle group G4 includes a seventh nozzle array L7 and an eighth nozzle array L8 that discharge the reaction liquid. The fifth nozzle group G5 includes a ninth nozzle array L9 that discharges black ink and a tenth nozzle array L10 that discharges cyan ink. The sixth nozzle group G6 includes an eleventh nozzle array L11 that discharges yellow ink and a twelfth nozzle array L12 that discharges magenta ink.

Figure 3:
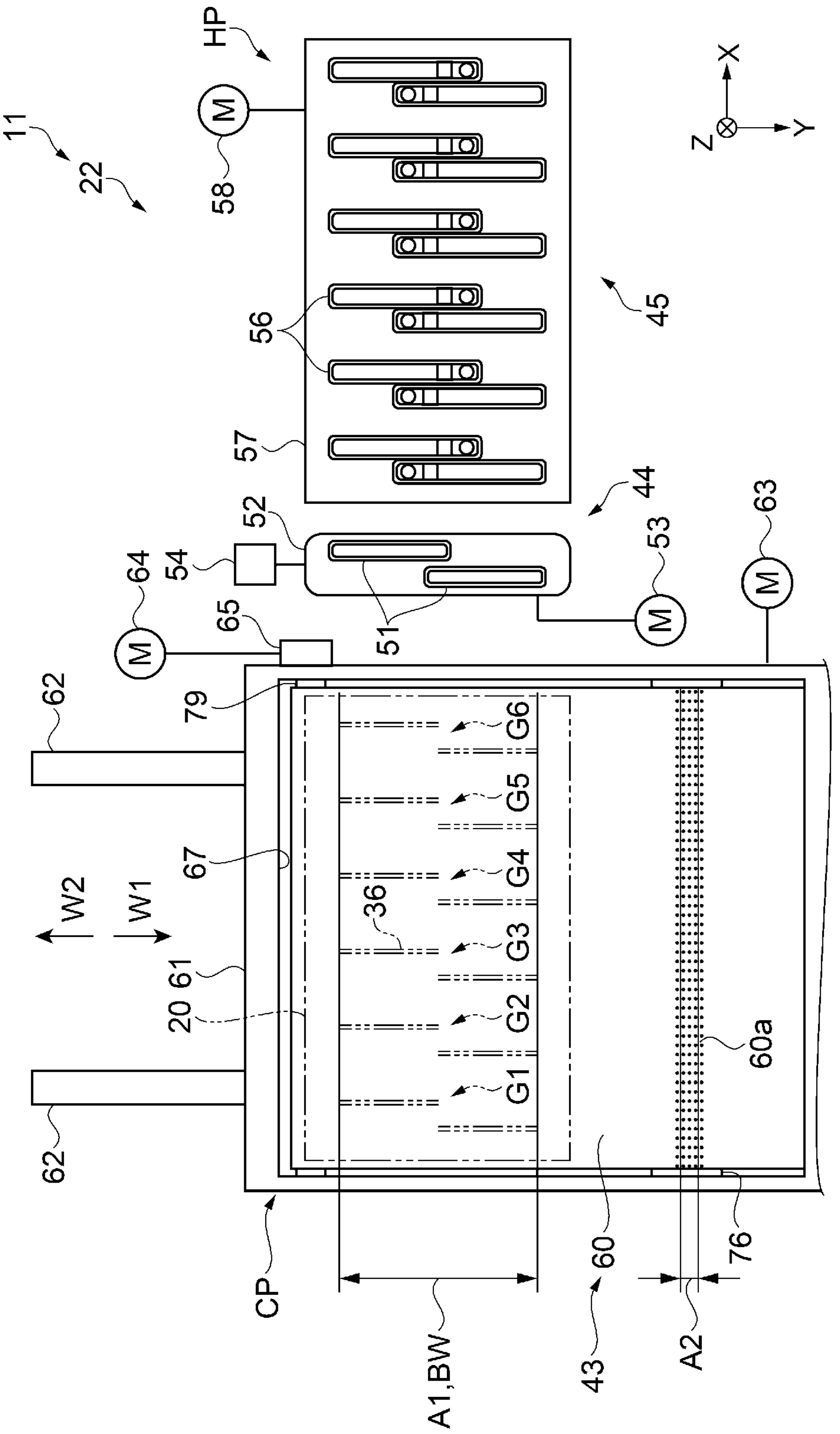
FIG. 3 is a schematic plan view of a maintenance unit.

Next, the maintenance unit 22 will be described. As shown in FIG. 3, the maintenance unit 22 has a liquid collection device 43, a suction device 44, and a capping device 45 arranged in the width direction X. Above, that is, in the −Z direction of, the capping device 45 is a home position HP of the liquid ejecting portion 20. The home position HP is the starting point of movement of the liquid ejecting portion 20. Above, that is, in the −Z direction of, the liquid collection device 43 is a cleaning position CP of the liquid ejecting portion 20. In FIG. 3, the liquid ejecting portion 20 located at the cleaning position CP is indicated by a two dot chain line.

The suction device 44 includes a suction cap 51, a suction holder 52, a suction motor 53 for reciprocating the suction holder 52 along the Z axis, and pressure reducing mechanism 54 for reducing the pressure inside the suction cap 51. A suction motor 53 moves a suction cap 51 between a capping position and a retreat position. The capping position is a position at which the suction cap 51 contacts the liquid ejecting portion 20 and surrounds the nozzle 36. The retreat position is a position where the suction cap 51 separates from the liquid ejecting portion 20. The suction cap 51 may have a configuration in which all the nozzles 36 are surrounded by the suction cap 51, a configuration in which at least one nozzle group is surrounded by the suction cap 51, or a configuration in which some of the nozzles 36 constituting a nozzle group are surrounded by the suction cap 51. In the suction device 44 of the present embodiment, one nozzle group out of the first nozzle group G1 to the sixth nozzle group G6 is surrounded by two suction caps 51.

The liquid ejecting apparatus 11 performs suction cleaning in which the liquid ejecting portion 20 is positioned above the suction device 44, the suction cap 51 is positioned at the capping position to surround one nozzle group, and the pressure in the suction cap 51 is reduced to discharge the liquid from the nozzles 36. That is, the suction device 44 receives the liquid discharged by the suction cleaning.

The capping device 45 includes a standby cap 56, a standby cap holder 57, and a standby cap motor 58 that reciprocates the standby cap holder 57 along the Z axis. The standby cap holder 57 and the standby cap 56 are moved upward or downward by driving the standby cap motor 58. The standby cap 56 moves from a separation position, which is a lower position in the +Z direction, to a capping position, which is an upper position, and comes into contact with the liquid ejecting portion 20 stopped at the home position HP.

The standby cap 56 positioned at the capping position surrounds the openings of the nozzles 36 constituting the first nozzle group G1 to the sixth nozzle group G6. The maintenance in which the standby cap 56 surrounds the opening of the nozzle 36 is referred to as standby capping. Standby capping is a type of capping. By the standby capping, drying of the nozzle 36 is suppressed.

The standby cap 56 may be configured to surround all the nozzles 36 collectively, may be configured to surround at least one nozzle group, or may be configured to surround some of the nozzles 36 constituting a nozzle group.

Next, the liquid collection device 43 will be described. As shown in FIG. 3, the liquid collection device 43 includes a strip member 60 capable of absorbing liquid. The strip member 60 is an example of a sheet-like absorbing member. The liquid collection device 43 includes a case 61 that accommodates the strip member 60, a pair of rails 62 extending along the Y axis, a wiping motor 63, a winding motor 64, and a power transmission mechanism 65 that transmits power of the winding motor 64. The case 61 has an opening 67 through which the strip member 60 is exposed. When the size of the strip member 60 in the width direction X is equal to or larger than the size of the nozzle face 40, the liquid ejecting portion 20 can be efficiently maintained.

Figure 4:
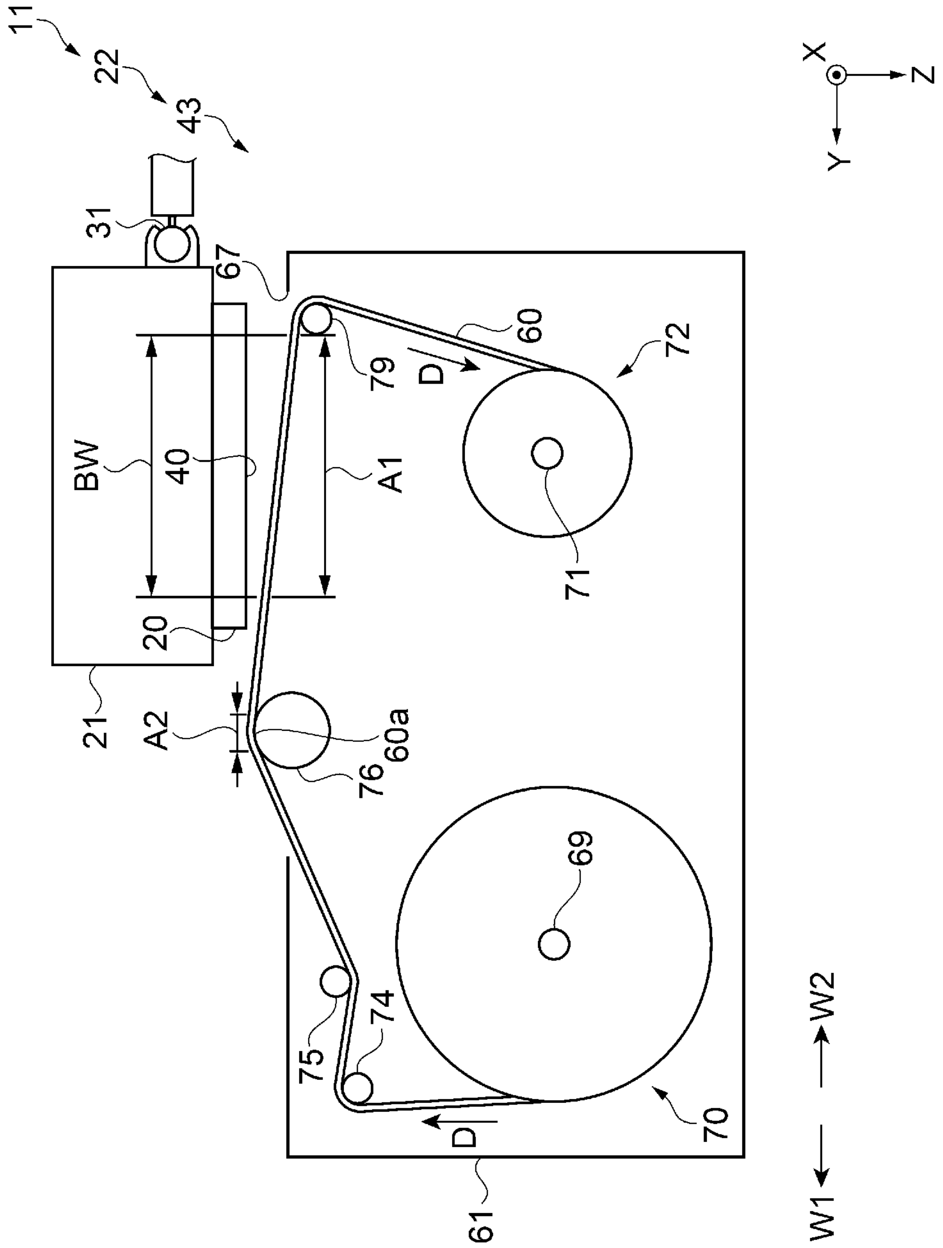
FIG. 4 is a schematic side view of a liquid collection device with a case in a receiving position.
Figure 6:
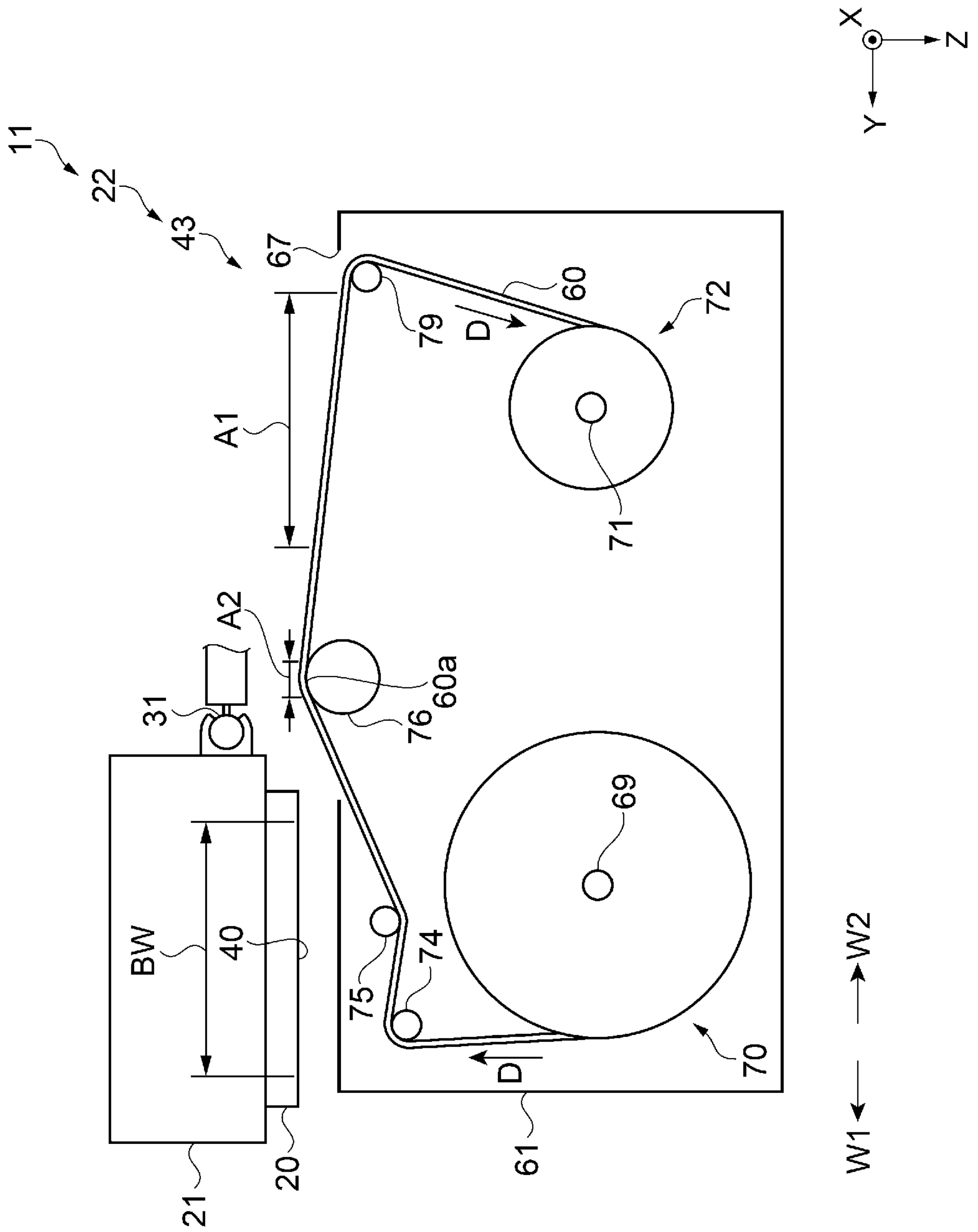
FIG. 6 is a schematic side view of the liquid collection device with the case in a non-collection position.

The case 61 reciprocates along the Y axis on the rails 62 by the power of the wiping motor 63. Specifically, the case 61 moves between a receiving position shown in FIGS. 3 and 4 and a non-collection position shown in FIG. 6. The standby position of the case 61 in the present embodiment is the receiving position. As shown in FIGS. 3 and 4, when the case 61 is located at the receiving position and the liquid ejecting portion 20 is located at the cleaning position CP, the strip member 60 faces the nozzle face 40. Further, as shown in FIG. 6, when the case 61 is located at the non-collection position and the liquid ejecting portion 20 is located at the cleaning position CP, the case 61 faces the nozzle face 40.

When the wiping motor 63 is driven to rotate forward, the case 61 located at the receiving position moves in the first wiping direction W1 parallel to the Y axis toward the non-collection position. When the wiping motor 63 is driven in the reverse direction, the case 61 located at the non-collection position moves in a second wiping direction W2 opposite to the first wiping direction W1 toward the receiving position.

The liquid ejecting apparatus 11 wipes the liquid ejecting portion 20 in at least one of a process in which the case 61 moves from the receiving position to the non-collection position and a process in which the case 61 moves from the non-collection position to the receiving position. Wiping is maintenance in which the nozzle face 40 is wiped by the strip member 60.

In addition, the liquid ejecting apparatus 11 according to the present embodiment performs flushing from the liquid ejecting portion 20 to the liquid collection device 43 located at the receiving position. The liquid collection device 43 receives the liquid discharged from the liquid ejecting portion 20 by flushing. Flushing is maintenance in which liquid is discharged as waste liquid for the purpose of either preventing or eliminating clogging of the nozzle 36.

In addition, the liquid ejecting apparatus 11 may perform pressurization cleaning in which pressurized liquid is discharged from the nozzles 36 of the liquid ejecting portion 20 with respect to the liquid collection device 43 positioned at the receiving position. In this case, the liquid collection device 43 receives the liquid discharged by the pressurized cleaning. The pressurized cleaning is maintenance for discharging the liquid as waste liquid for the purpose of normally maintaining the state of the liquid in the liquid ejecting portion 20 and the supply flow path 27.

As shown in FIG. 4, the liquid collection device 43 includes an unwinding portion 70 having an unwinding shaft 69 and a winding portion 72 having a winding shaft 71. The unwinding portion 70 holds the strip member 60 in a state of being wound into a roll. The strip member 60 unwound and fed from the unwinding portion 70 is transported to the winding portion 72 along a transport path. The liquid collection device 43 includes an upstream roller 74, a tension roller 75, a pressing section 76, and a downstream roller 79 that are provided in this order from the upstream side along a transport path of the strip member 60. The case 61 rotatably supports the unwinding shaft 69, the upstream roller 74, the tension roller 75, the pressing section 76, the downstream roller 79, and the winding shaft 71 about an X axis as an axial direction.

The winding shaft 71 is rotated by drive of the winding motor 64. The winding portion 72 winds the strip member 60 around the winding shaft 71 into a roll shape. The winding portion 72 moves the strip member 60 in the D direction to wind up the portion of the strip member 60 unwound from the unwinding portion 70. The D direction is a direction along the transport path of the strip member 60, and is a movement direction from the unwinding portion 70 on the upstream side toward the winding portion 72 on the downstream side.

The power transmission mechanism 65 transmits the driving force of the winding motor 64 to the winding shaft 71. The winding motor 64 may rotationally drive at least one of the winding shaft 71, the upstream roller 74, the tension roller 75, the pressing section 76, and the downstream roller 79 together with the winding shaft 71. The power transmission mechanism 65 may connect the winding motor 64 and the winding shaft 71 when the case 61 is located at the standby position, and may disconnect the winding motor 64 and the winding shaft 71 when the case 61 is separated from the standby position.

The tension roller 75 is disposed upstream of the pressing section 76 in the D direction and lower than the pressing section 76 in the gravity direction Z. The tension roller 75 applies tension to the strip member 60 by pressing the strip member 60 downward.

The pressing section 76 of the present embodiment is a roller around which the strip member 60 winds. The pressing section 76 pushes the strip member 60 unwound from the unwinding portion 70 upward from below so that the strip member 60 protrudes from the opening 67.

The transport path includes an upstream region upstream from the pressing section 76, a contact region A2 in which the strip member 60 can be brought into contact with the liquid ejecting portion 20, and a downstream region downstream from the pressing section 76.

Figure 5:
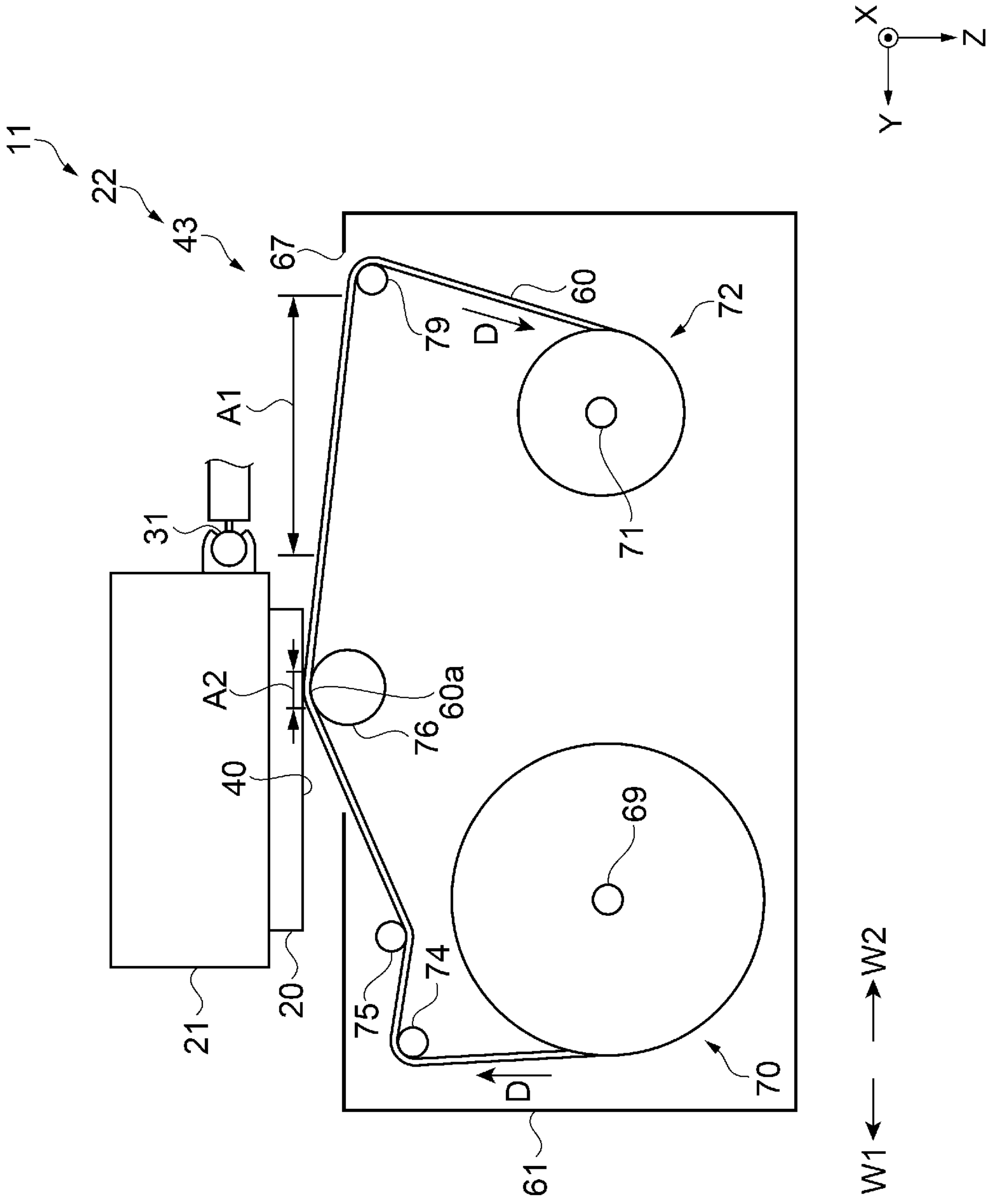
FIG. 5 is a schematic side view of a liquid collection device that wipes a liquid ejecting portion.

As shown in FIGS. 4 to 6, the upstream region is a region from the lowermost portion of the tension roller 75 to the upstream end of the contact region A2 in the D direction. The pressing section 76 is located downstream from the tension roller 75 in the D direction and higher than the tension roller 75. Therefore, the strip member 60 located in the upstream region forms an ascending slope that ascends in a direction opposite to the gravity direction Z as it goes downstream in the D direction.

The contact region A2 is a region that contacts the liquid ejecting portion 20 when wiping is performed. The pressing section 76 can press the contact region A2 of the strip member 60 located at the contact position 60*a* so as to bring the contact region A2 into contact with the liquid ejecting portion 20. That is, the liquid collection device 43 wipes the liquid ejecting portion 20 by moving the case 61 in a state in which the contact region A2 is in contact with the liquid ejecting portion 20. In other words, the strip member 60 is provided so that the contact region A2, where the strip member 60 contacts the liquid ejecting portion 20 when liquid is to be collected from the liquid ejecting portion 20 by contact with the liquid ejecting portion 20, is settable on the strip member 60. In FIG. 3, the contact position 60*a* is indicated by hatching.

The downstream region is a region from the downstream end of the contact region A2 in the D direction to the uppermost portion of the downstream roller 79. The downstream roller 79 is located downstream from the pressing section 76 in the direction D and lower than the pressing section 76. Therefore, the strip member 60 located in the downstream region has a downward slope which gradually descends in the gravity direction Z as it goes downstream in the direction D. The strip member 60 located in the downstream region is exposed from the opening 67.

As shown in FIG. 4, when the case 61 is located at the receiving position and the liquid ejecting portion 20 is located at the cleaning position CP, the strip member 60 located in the receiving region A1 in the downstream region faces the region BW of the nozzle face 40. In this state, the liquid ejecting apparatus 11 performs either flushing or pressurized cleaning. In this case, the liquid collection device 43 receives, in the receiving region A1, the liquid that was discharged by either flushing or pressurized cleaning.

In other words, the strip member 60 is provided such that the receiving region A1 for receiving the liquid discharged as a waste liquid from the liquid ejecting portion 20 is settable in the strip member 60. In the present embodiment, the contact region A2 is set upstream of the receiving region A1 in the D direction.

Next, a maintenance operation of the liquid ejecting apparatus 11 according to the embodiment will be described. First, a case where the control section 29 of the liquid ejecting apparatus 11 sequentially performs suction cleaning, wiping, and flushing will be described as the maintenance of the liquid ejecting portion 20.

The control section 29 stops the liquid ejecting portion 20 above the suction device 44, and performs suction cleaning on a nozzle group requiring suction cleaning. When the suction cleaning ends, the control section 29 moves the liquid ejecting portion 20 to the cleaning position CP.

As shown in FIG. 4, in a state in which the case 61 is located at the receiving position, which is the standby position, the control section 29 drives the wiping motor 63 in reverse to move the case 61 in the second wiping direction W2.

As shown in FIG. 5, the liquid collection device 43 wipes the contact region A2 by bringing the contact region A2 into contact with the liquid ejecting portion 20. Specifically, the liquid collection device 43 performs wiping by the pressing section 76 pressing the contact region A2 of the strip member 60 against the nozzle face 40 and the case 61 moving in a state in which the strip member 60 is sandwiched between the pressing section 76 and the nozzle face 40.

As shown in FIG. 6, when the case 61 moves to the non-collection position, the control section 29 stops driving the wiping motor 63 and moves the liquid ejecting portion 20 from the cleaning position CP. Afterward, the control section 29 drives the wiping motor 63 to rotate forward to move the case 61 in the first wiping direction W1.

Figure 7:
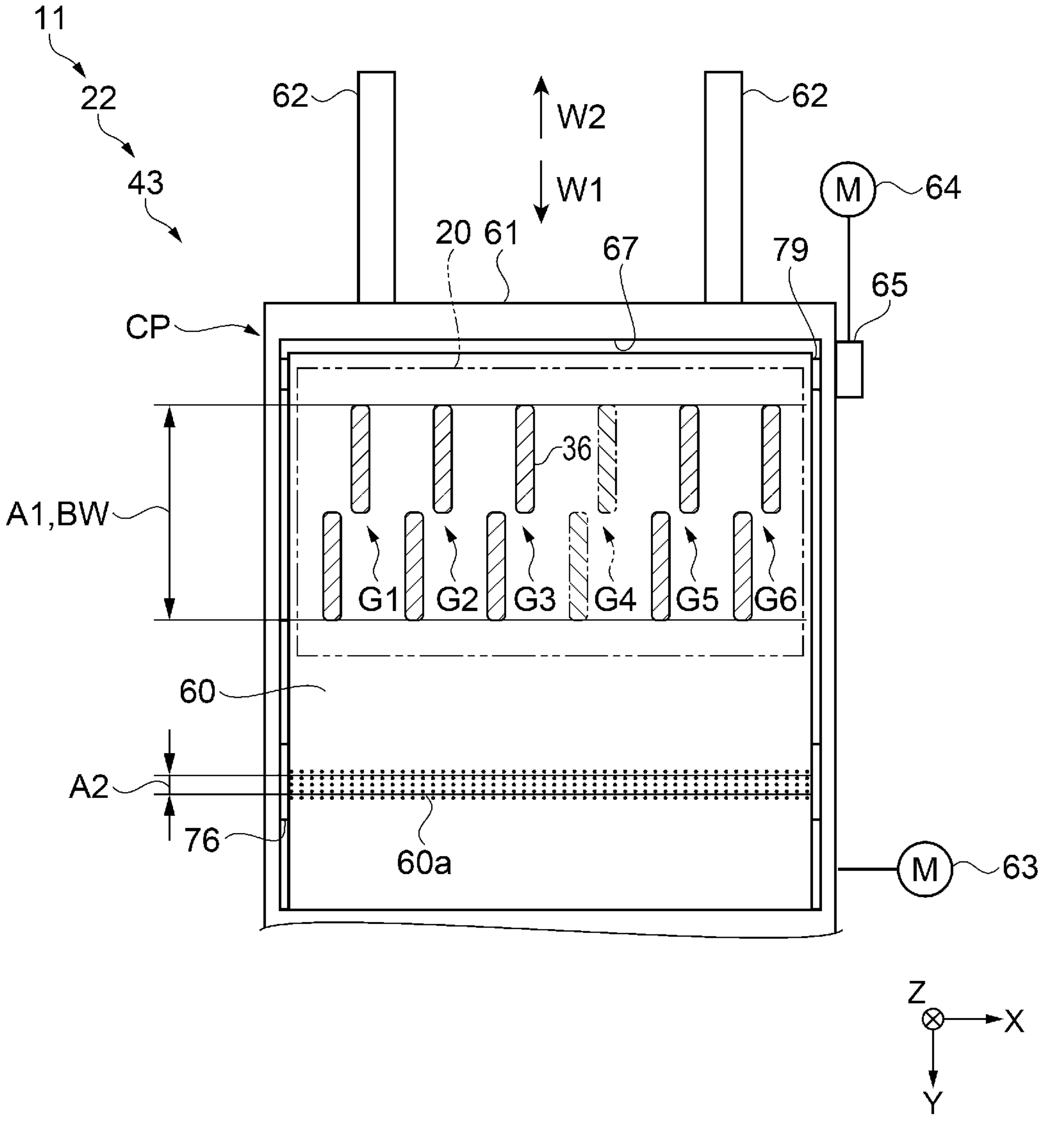
FIG. 7 is a schematic plan view showing liquid discharged to a receiving region A1 in a first embodiment.

When the wiping ends, the control section 29 moves the liquid ejecting portion 20 to the cleaning position CP in a state in which the case 61 is located at the receiving position. Then, as shown in FIG. 7, the control section 29 performs flushing in which the liquid is discharged from the nozzles 36 of the liquid ejecting portion 20 to the receiving region A1 of the strip member 60 facing the liquid ejecting portion 20. In FIGS. 7 to 11, 13 and 15 to 19, the regions in which liquid adheres to the strip member 60 are indicated by hatching. In addition, the case where the liquid is ink is indicated by hatching lines that slant in the −Y direction with distance in the +X direction, and the case where the liquid is a reaction liquid is indicated by hatching lines that slant in the +Y direction with distance in the +X direction.

The liquid discharged to the strip member 60 diffuses in the strip member 60. The liquid that was discharged to the receiving region A1 of the strip member 60 by flushing spreads over time from the range indicated by hatching in FIG. 7 to a large region. Therefore, the region of the strip member 60 in which the liquid is received also broadens in the direction toward the contact region A2, which is the +Y direction. When the liquid received in the receiving region A1 wets the strip member 60 and spreads toward the contact region A2, there is a concern that the portion of the strip member 60 which the liquid wet and spreads will contact the liquid ejecting portion 20.

Figure 8:
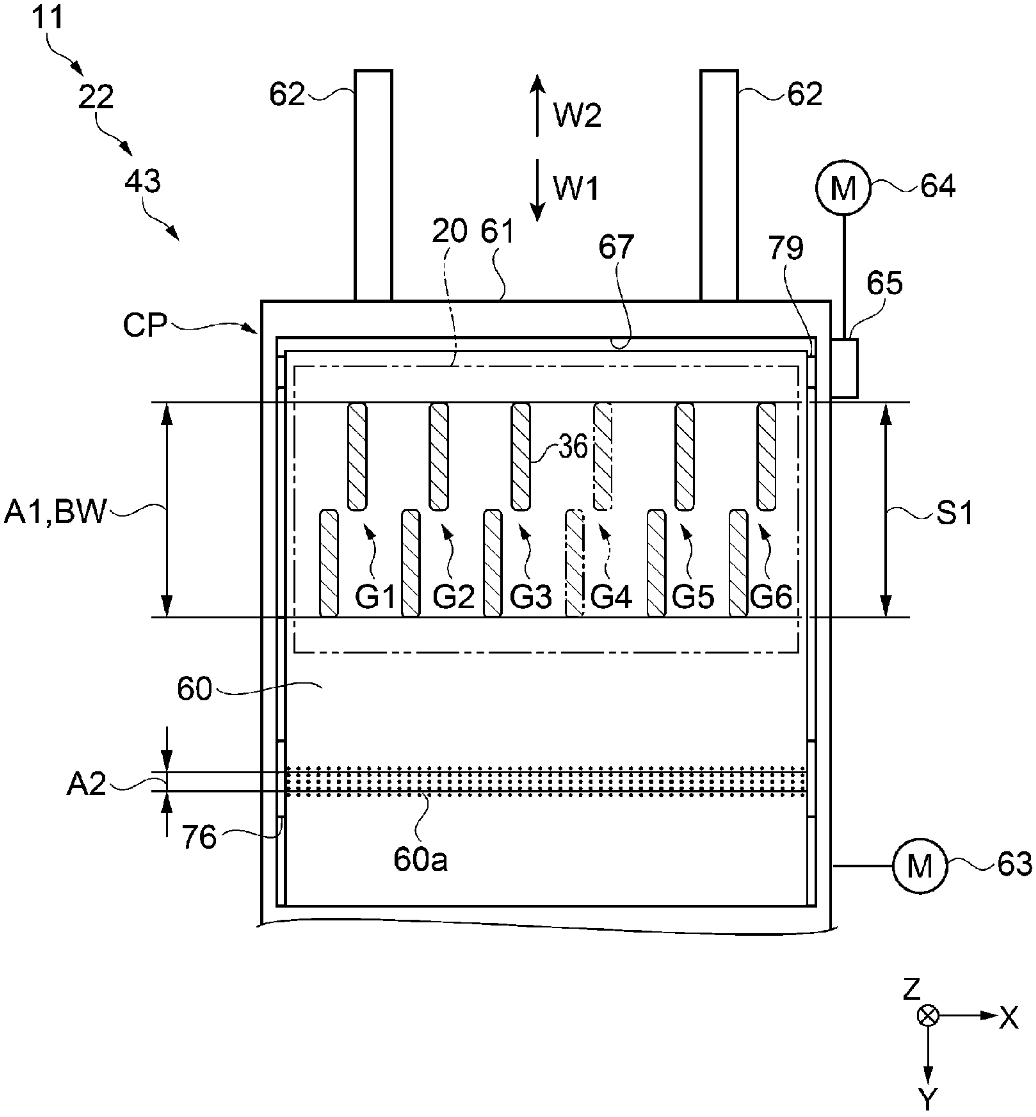
FIG. 8 is a schematic plan view showing reaction liquid supplied to a supply region S1 of the first embodiment.

In the present embodiment, after the flushing is performed, the control section 29, while moving the liquid ejecting portion 20 in the X axis direction, discharges the reaction liquid from the nozzles 36 constituting the fourth nozzle group G4 to a position overlapping the region where the ink was discharged by flushing, as indicated by hatching in FIG. 8.

By this, the viscosities of the ink and the reaction liquid increase by the ink received by the strip member 60 and the reaction liquid supplied to the strip member 60 contacting each other. In addition, the ink and the reaction liquid are cured by the ink absorbed by the strip member 60 and the reaction liquid supplied to the strip member 60 contacting each other. As a result, the ink and reaction liquid received in the receiving region A1 can be suppressed from spreading toward the contact region A2 in the strip member 60.

Assuming that a region of the strip member 60 to which the reaction liquid is discharged from the nozzles 36 constituting the fourth nozzle group G4 is a supply region S1, the supply region S1 is positioned within the receiving region A1. The nozzles 36 constituting the fourth nozzle group G4 are an example of a supply portion RLS capable of supplying a reaction liquid having a component that cures ink to the strip member 60. In this case, it can be said that the supply portion RLS includes the nozzles 36 constituting the fourth nozzle group G4.

The supply of the reaction liquid to the strip member 60 may be performed before the flushing operation. In this case, for example, the control section 29 discharges the reaction liquid from the nozzles 36 constituting the fourth nozzle group G4 to the supply region S1 indicated by hatching in FIG. 8 while moving the liquid ejecting portion 20 in the X axis direction. Thereafter, the control section 29 moves the liquid ejecting portion 20 to the cleaning position CP. Then, as shown in FIG. 7, the control section 29 performs flushing in which the liquid is discharged from the nozzles 36 of the liquid ejecting portion 20 to the receiving region A1 of the strip member 60 facing the liquid ejecting portion 20.

In a case where reaction liquid is discharged from the nozzles 36 that constitute the fourth nozzle group G4 to the supply region S1, which overlaps the region where the ink is discharged by flushing, the discharge of reaction liquid from the nozzles 36 that constitute the fourth nozzle group G4 to the region indicated by the two dot chain line in FIG. 7 need not be performed during flushing.

Figure 9:
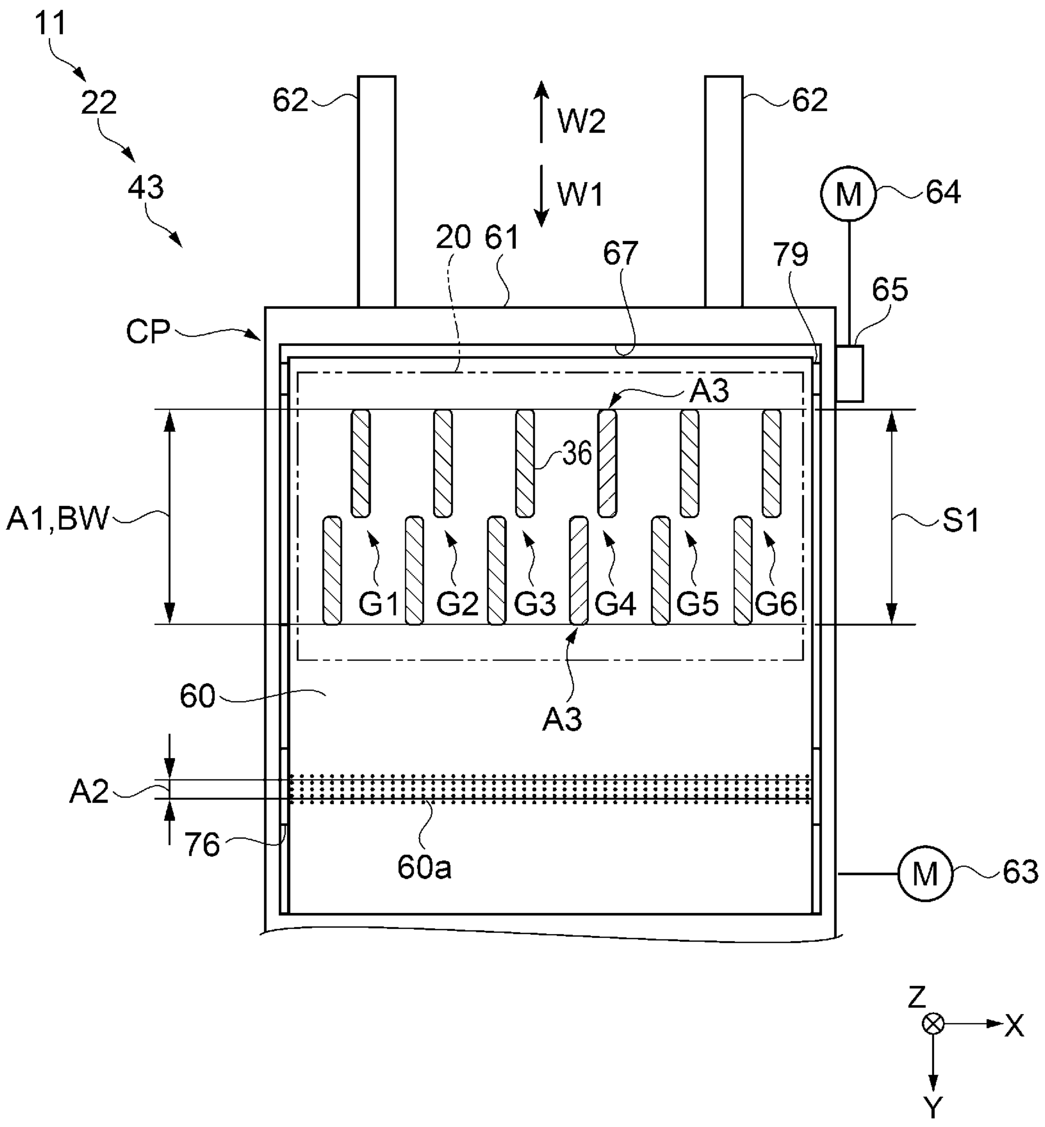
FIG. 9 is a schematic plan view showing liquid discharged to a discharge region A3 in the first embodiment.

Further, in the case where there is a concern that the reaction liquid discharged as flushing in the region indicated by the two dot chain line in FIG. 7 might not contact other ink, then, as shown in FIG. 9, ink may be discharged to the discharge region A3, which overlaps the region indicated by the two dot chain line in FIG. 7, from any of the nozzles 36 constituting the first nozzle group G1 to the third nozzle group G3, the fifth nozzle group G5, and the sixth nozzle group G6.

Figure 10:
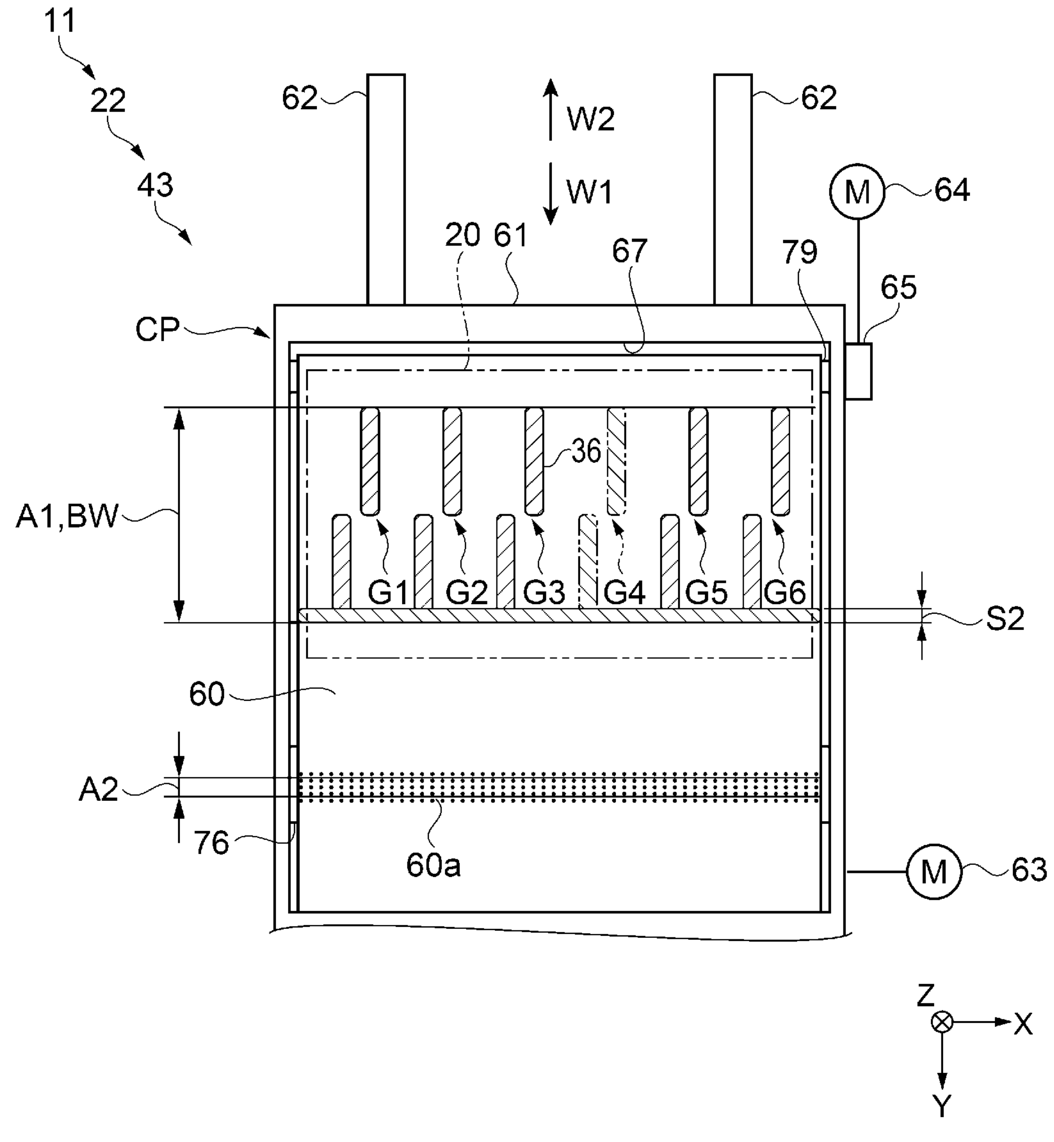
FIG. 10 is a schematic plan view showing reaction liquid supplied to a supply region S2 in the first embodiment.

Further, the reaction liquid may be supplied to the strip member 60 in a supply region S2 indicated by hatching in FIG. 10 instead of in the supply region S1. The supply region S2 is located in the receiving region A1. The supply region S2 overlaps an end of the receiving region A1 on the +Y direction side. The end on the +Y direction side of the receiving region A1 is an end in the receiving region A1 at the upstream side in the D direction, and is a position in the receiving region A1 closest to the contact region A2. That is, the supply region S2 overlaps with the position of the receiving region A1 closest to the contact region A2. The supply region S2 extends in a band shape in the X axis direction, which is the width direction of the strip member 60. The dimension of the supply region S2 in the X axis direction may be the same as the width dimension of the strip member 60. The dimension of the supply region S2 in the Y axis direction may be smaller than half of the dimension of the first nozzle array L1 to the twelfth nozzle array L12 in the Y axis direction.

When the reaction liquid is supplied to the supply region S2, for example, the control section 29 discharges the reaction liquid from the nozzles 36 constituting the fourth nozzle group G4 to the supply region S2 while moving the liquid ejecting portion 20 in the X axis direction. At this time, the reaction liquid is discharged to the supply region S2 from some of the nozzles 36 facing the supply region S2, from among the nozzles 36 constituting the fourth nozzle group G4. Some nozzles 36 facing the supply region S2 are nozzles 36 constituting the +Y direction side of the fourth nozzle group G4. Alternatively, when the reaction liquid is supplied to the supply region S2, the reaction liquid may be discharged to the supply region S2 from one nozzle at the end in the +Y direction, from among the nozzles 36 constituting the fourth nozzle group G4.

Figure 11:
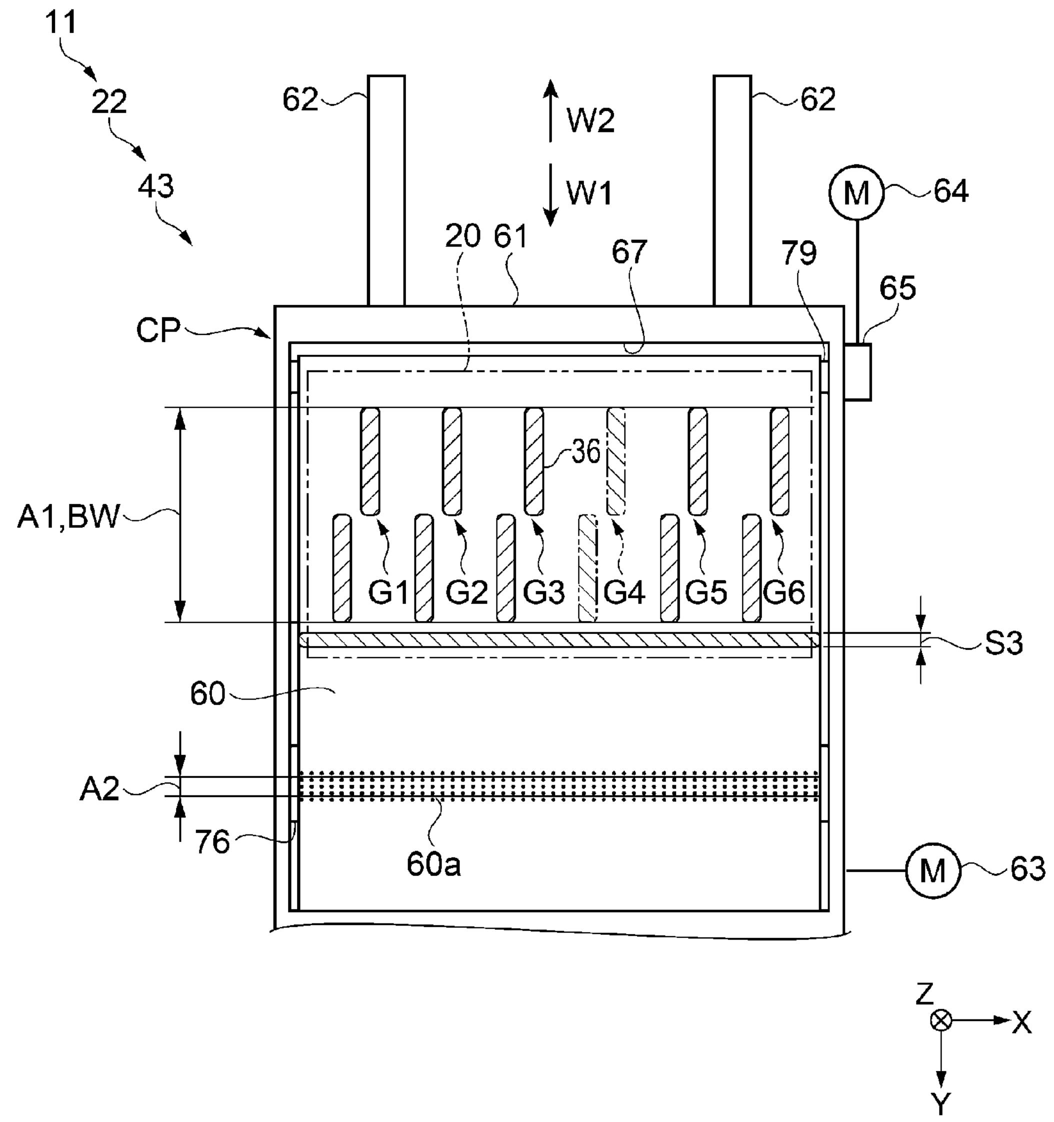
FIG. 11 is a schematic plan view showing reaction liquid supplied to a supply region S3 in the first embodiment.

Further, instead of in the supply region S1, the reaction liquid may be supplied to the strip member 60 in a supply region S3 indicated by hatching in FIG. 11. The supply region S3 is located between the receiving region A1 and the contact region A2 in the Y axis direction. The supply region S3 extends in a band shape in the X axis direction, which is the width direction of the strip member 60. The dimension of the supply region S3 in the X axis direction may be the same as the width dimension of the strip member 60. The dimension of the supply region S3 in the Y axis direction may be smaller than half of the dimension of the first nozzle array L1 to the twelfth nozzle array L12 in the Y axis direction.

Figure 12:
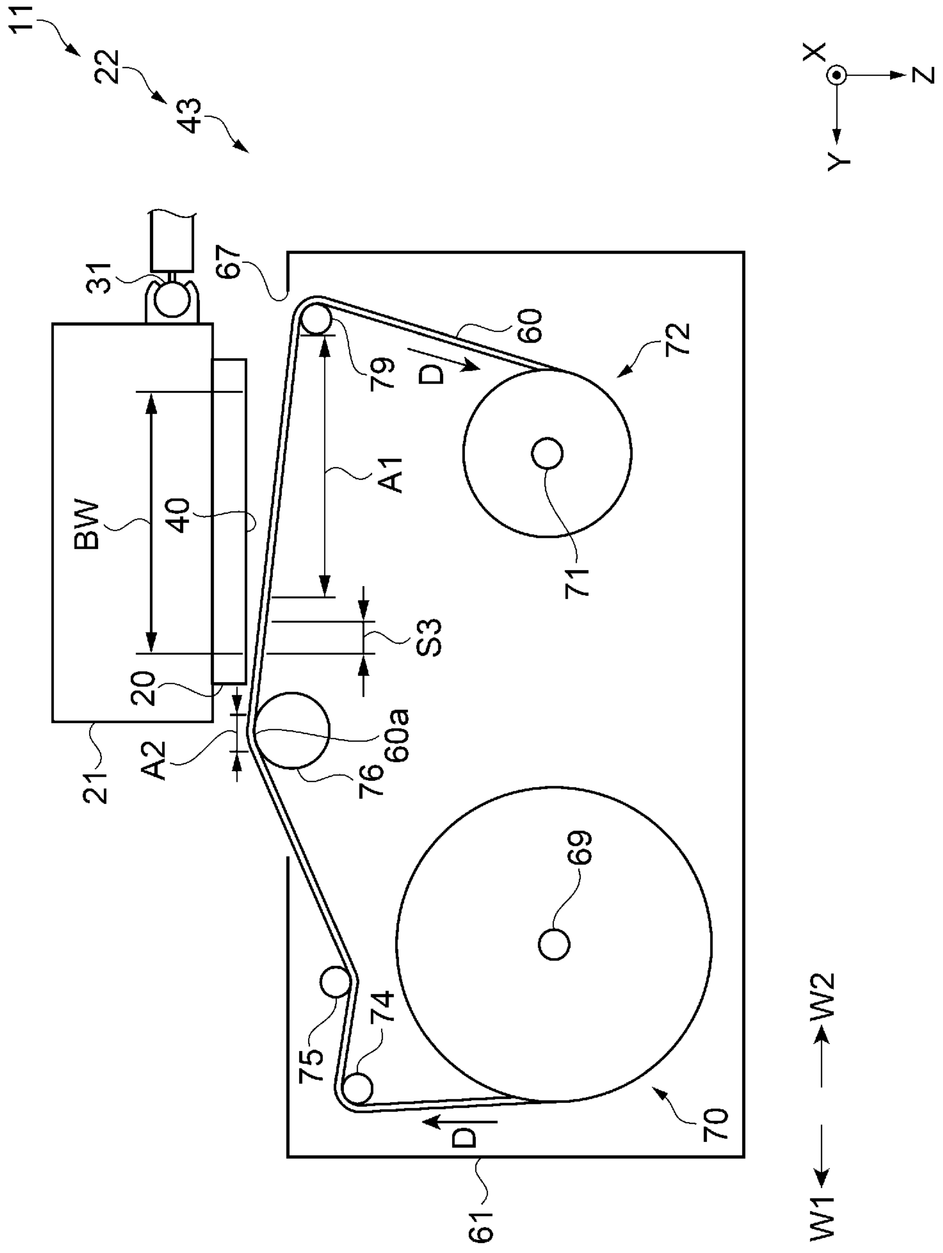
FIG. 12 is a schematic side view showing a liquid collection device when reaction liquid is supplied to a supply region S3 in the first embodiment.

When the reaction liquid is supplied to the supply region S3, for example, the control section 29 drives the wiping motor 63 and moves the case 61 to a position in the −Y direction from the receiving position as illustrated in FIG. 12. As a result, the supply region S3 is set in the downstream region of the strip member 60. Then, the control section 29 discharges the reaction liquid from the nozzles 36 constituting the fourth nozzle group G4 to the supply region S3 while moving the liquid ejecting portion 20 in the X axis direction. At this time, the reaction liquid is discharged to the supply region S3 from some nozzles 36 facing the supply region S3, from among the nozzles 36 constituting the fourth nozzle group G4. Some nozzles 36 facing the supply region S3 are nozzles 36 constituting the +Y direction side of the fourth nozzle group G4. Alternatively, when the reaction liquid is supplied to the supply region S3, the reaction liquid may be discharged to the supply region S3 from one nozzle at the end in the +Y direction, of the nozzles 36 constituting the fourth nozzle group G4.

Figure 13:
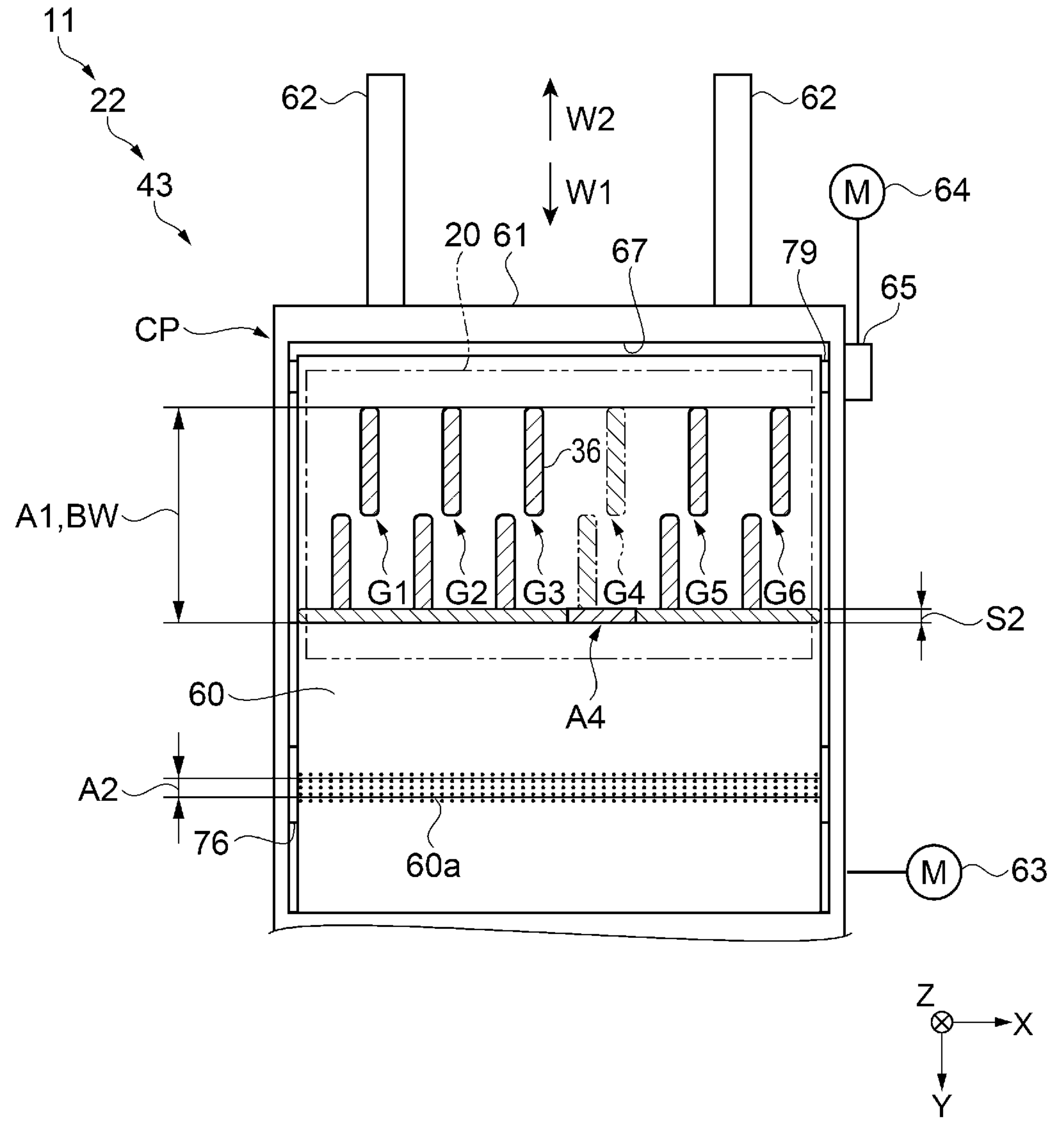
FIG. 13 is a schematic plan view showing liquid discharged to a discharge region A4 in first embodiment.

In a case where the reaction liquid is supplied to the supply region S2, when there is a possibility that the reaction liquid discharged as flushing in the region indicated by a two dot chain line in FIG. 10 will not contact other ink, then as shown in FIG. 13, the ink may be discharged to a discharge region A4, which overlaps the supply region S2, from any one of the nozzles 36 constituting the first nozzle group G1 to the third nozzle group G3, the fifth nozzle group G5, or the sixth nozzle group G6.

The dimension of the discharge region A4 in the X axis direction may be smaller than the dimension of the supply region S2 in the X axis direction. Further, the dimension of the discharge region A4 in the X axis direction may be larger than the dimension in the X axis direction of the region indicated by the two dot chain line in FIG. 10. When the reaction liquid is supplied to the supply region S3, if the reaction liquid discharged in the region indicated by the two dot chain line in FIG. 11 in flushing might not contact other ink, ink may be discharged from any of the nozzles 36 constituting the first nozzle group G1 to the third nozzle group G3, the fifth nozzle group G5, or the sixth nozzle group G6 to the discharge region A4 as in the case of supplying the reaction liquid to the supply region S2 or to a region overlapping the supply region S3.

In the wiping, when the amount of the liquid collected in the contact region A2 of the strip member 60 is large, the liquid collected in the contact region A2 may wet the strip member 60 and spread in the strip member 60 toward the upstream side in the D direction, and the region of the strip member 60 where the liquid has wet and spread may contact the liquid ejecting portion 20 in the next wiping. In this case, the reaction liquid may be supplied to the contact region A2 where the liquid was collected by wiping.

Specifically, after wiping is performed, the control section 29 causes the winding portion 72 to wind up the strip member 60, thereby moving the contact region A2 in which the liquid has collected by wiping in the D direction. Then, the control section 29 positions the contact region A2, in which the liquid has collected by wiping, to within the receiving region A1.

Thereafter, for example, the control section 29 discharges the reaction liquid from the nozzles 36 constituting the fourth nozzle group G4 to the supply region S2 while moving the liquid ejecting portion 20 in the X axis direction. Alternatively, the control section 29 may discharge the reaction liquid from the nozzles 36 constituting the fourth nozzle group G4 to the supply region S3.

In this case, for example, it will be assumed that the contact region A2 that moved into the receiving region A1 and collected liquid by wiping is a collection region CR, and that a region set as the contact region A2 in the strip member 60 to be used in the next wiping is a wiping region WR. At this time, the nozzles 36 constituting the fourth nozzle group G4 supply the reaction liquid to the the supply region S2 or to the supply region S3 of the strip member 60 between the wiping region WR and the position in the collection region CR farthest from the wiping region WR.

Next, a case will be described where the control section 29 sequentially performs pressure cleaning, wiping, and flushing as maintenance of the liquid ejecting apparatus 11. As shown in FIGS. 3 and 4, when the pressure cleaning is performed, the control section 29 positions the case 61 at the receiving position. Thereafter, the control section 29 moves the liquid ejecting portion 20 to the cleaning position CP and then stops the liquid ejecting portion 20.

The control section 29 controls the liquid supply device 23 to supply pressurized liquid to the nozzles 36 to discharge the liquid from the nozzles 36. The liquid discharged from the nozzles 36 drips from the nozzle face 40. At this time, the strip member 60 is positioned vertically below the nozzles 36 in the +Z direction. Therefore, the liquid discharged as a waste liquid from the nozzles 36 by the pressurized cleaning is received by the receiving region A1 set in the strip member 60, similarly to the flushing.

As shown in FIG. 5, after the control section 29 performs the pressurized cleaning, the control section 29 drives the wiping motor 63 to rotate in the reverse direction while keeping the liquid ejecting portion 20 stopped, and moves the case 61 in the second wiping direction W2. That is, the control section 29 performs wiping by bringing the contact region A2 of the strip member 60 into contact with the nozzle face 40, and in the contact region A2 collects the liquid that was discharged by the pressure cleaning and that remained on the nozzle face 40. After performing wiping, the control section 29 moves the liquid ejecting portion 20 to perform flushing.

In the present embodiment, also in a case where pressurized cleaning, wiping, and flushing are performed as maintenance of the liquid ejecting apparatus 11, similarly to a case where suction cleaning, wiping, and flushing are sequentially performed as maintenance of the liquid ejecting portion 20, the reaction liquid is discharged from the nozzles 36 constituting the fourth nozzle group G4 to any one of the supply regions S1, S2, and S3 set in the strip member 60.

In addition, in the present embodiment, the control section 29 moves the liquid ejecting portion 20 to the cleaning position CP at intervals of a predetermined time during printing. Then, the control section 29 performs flushing in which liquid is discharged from the nozzles 36 of the liquid ejecting portion 20 with respect to the receiving region A1 of the strip member 60 to which the liquid ejecting portion 20 faces. As described above, when flushing is performed during printing as maintenance of the liquid ejecting portion 20, the reaction liquid may be discharged from the nozzles 36 constituting the fourth nozzle group G4 to any one of the supply regions S1, S2, and S3 set in the strip member 60.

The supply regions S1, S2, and S3 are set at positions in the strip member 60 between the contact region A2 and the −Y direction side end of the receiving region A1. In other words, the nozzles 36 constituting the fourth nozzle group G4 supply the reaction liquid to the supply regions S1, S2, and S3 set in the strip member 60 between the contact region A2 and the position in the receiving region A1 farthest from the contact region A2.

The +Y direction side ends of the supply regions S1, S2, and S3 are set in the strip member 60 at positions between the −Y direction side end of the receiving region A1 and the −Y direction side end of the contact region A2. The +Y direction side ends of the supply regions S1, S2, and S3 are set at positions in the strip member 60 downstream in the D direction with respect to the contact region A2 and separated away from the contact region A2.

In the present embodiment, the ends of the supply regions S1, S2, and S3 on the −Y direction side are set at positions in the strip member 60 between the end of the receiving region A1 on the −Y direction side and the end of the contact region A2 on the −Y direction side. However, as long as the reaction liquid supplied from the supply portion RLS to the strip member 60 comes into contact with the ink discharged to the set receiving region A1, the ends of the supply regions S1, S2, and S3 on the −Y direction side need not be set at positions between the end of the receiving region A1 on the −Y direction side and the end of the contact region A2 on the −Y direction side in the strip member 60.

For example, as long as the end in +Y direction side of the supply regions S1, S2, and S3 are set at positions between the −Y direction side end of the receiving region A1 and the −Y direction side end of the contact region A2, the −Y direction side end of the supply regions S1, S2, and S3 may be set at positions on the downstream side in the D direction with respect to the −Y direction side end of the receiving region A1. In other words, the supply portion RLS supplies the reaction liquid to a region of the strip member 60 that contacts the ink collected in the receiving region A1.

As described above, according to the liquid ejecting apparatus 11 according to the first embodiment, the following effects can be obtained.

The liquid ejecting apparatus 11 includes the liquid ejecting portion 20 that performs printing by ejecting ink from the nozzles 36 to the medium 14, the strip member 60 capable of absorbing the ink and the reaction liquid, and the supply portion RLS capable of supplying the reaction liquid, which has a component that cures the ink to the strip member 60. The strip member 60 is provided so be settable with the receiving region A1 for receiving either the ink or the reaction liquid discharged as waste liquid from the nozzles 36, and a contact region A2 for contacting the liquid ejecting portion 20 when collecting either the ink or the reaction liquid by contacting the liquid ejecting portion 20. The supply portion RLS supplies the reaction liquid to supply regions S1, S2, and S3 set in the receiving region A1 of the strip member 60, in between the contact region A2 and the position farthest from the contact region A2. According to this configuration, it is possible to suppress spread of the waste liquid received in the receiving region A1 toward the contact region A2 of the strip member 60, and thus it is easy to bring a region that has not absorbed waste liquid into contact with the liquid ejecting portion 20.

The liquid ejecting apparatus 11 further includes the unwinding portion 70 that holds the strip member 60 in a state of being wound in a roll shape, and the winding portion 72 that can move the strip member 60 in the D direction by winding up the strip member 60 from the unwinding portion 70, and the contact region A2 is set upstream in the D direction from the receiving region A1. According to this configuration, since a region of the strip member 60 which has not absorbed waste liquid can be set as the contact region A2, it is easy to bring the region which does not absorb the waste liquid into contact with the liquid ejecting portion 20.

The supply regions S1 and S2 are located in the receiving region A1. According to this configuration, it is possible to reduce the amount that the waste liquid received in the receiving region A1 spreads from the receiving region A1 toward the contact region A2.

The supply region S3 is located between the receiving region A1 and the contact region A2. According to this configuration, spread of the waste liquid received in the receiving region A1 toward the contact region A2 can be suppressed.

The supply portion RLS supplies the reaction liquid to the strip member 60 before the liquid ejecting portion 20 discharges the ink to the receiving region A1. According to this, by the reaction liquid absorbed by the strip member 60 and the ink discharged to the strip member 60 contacting each other, the viscosity of the ink and the reaction liquid increases. Further, the ink and the reaction liquid are cured by the reaction liquid absorbed by the strip member 60 and the ink discharged to the strip member 60 contacting each other. As a result, the waste liquid received in the receiving region A1 can be suppressed from spreading toward the contact region A2.

The supply portion RLS supplies the reaction liquid to the strip member 60 after the liquid ejecting portion 20 discharges the ink to the receiving region A1. Accordingly, the viscosity of the ink and the reaction liquid increases due to the ink absorbed by the strip member 60 and the reaction liquid supplied to the strip member 60 coming into contact with each other. Further, the ink and the reaction liquid are cured by the ink absorbed by the strip member 60 and the reaction liquid supplied to the strip member 60 contacting each other. As a result, the waste liquid received in the receiving region A1 can be suppressed from spreading toward the contact region A2.

The supply portion RLS includes nozzles 36 constituting the fourth nozzle group G4 capable of ejecting the reaction liquid, and the nozzles 36 constituting the fourth nozzle group G4 capable of ejecting the reaction liquid are provided in the liquid ejecting portion 20. According to this configuration, the reaction liquid can be supplied to the strip member 60 by utilizing the nozzles 36 constituting the fourth nozzle group G4 of the liquid ejecting portion 20.

In the liquid ejecting apparatus 11, printing is performed by the liquid ejecting portion 20 ejecting ink onto the medium 14 to which the supply portion RLS has supplied the reaction liquid. According to this, since it is possible to fix the ink to the medium 14 before the ink spreads on the medium 14, it is possible to improve image quality in printing.

2. Second Embodiment

Next, a liquid ejecting apparatus 11 according to a second embodiment as an embodiment of the present disclosure will be described. Portions common to those of the liquid ejecting apparatus 11 of the first embodiment are denoted by the same reference numerals, and description thereof will be omitted.

Assuming that the nozzles 36 capable of ejecting the reaction liquid are reaction liquid nozzles 36A and the nozzles 36 capable of ejecting the ink is ink nozzles 36B, the liquid ejecting portion 20 in the present embodiment includes a reaction liquid ejecting portion 20A having the reaction liquid nozzles 36A capable of ejecting the reaction liquid and an ink discharge section 20B having the ink nozzles 36B capable of ejecting ink. In other words, the liquid ejecting apparatus 11 of the present embodiment includes the reaction liquid ejecting portion 20A having the reaction liquid nozzles 36A capable of ejecting the reaction liquid.

Figure 14:
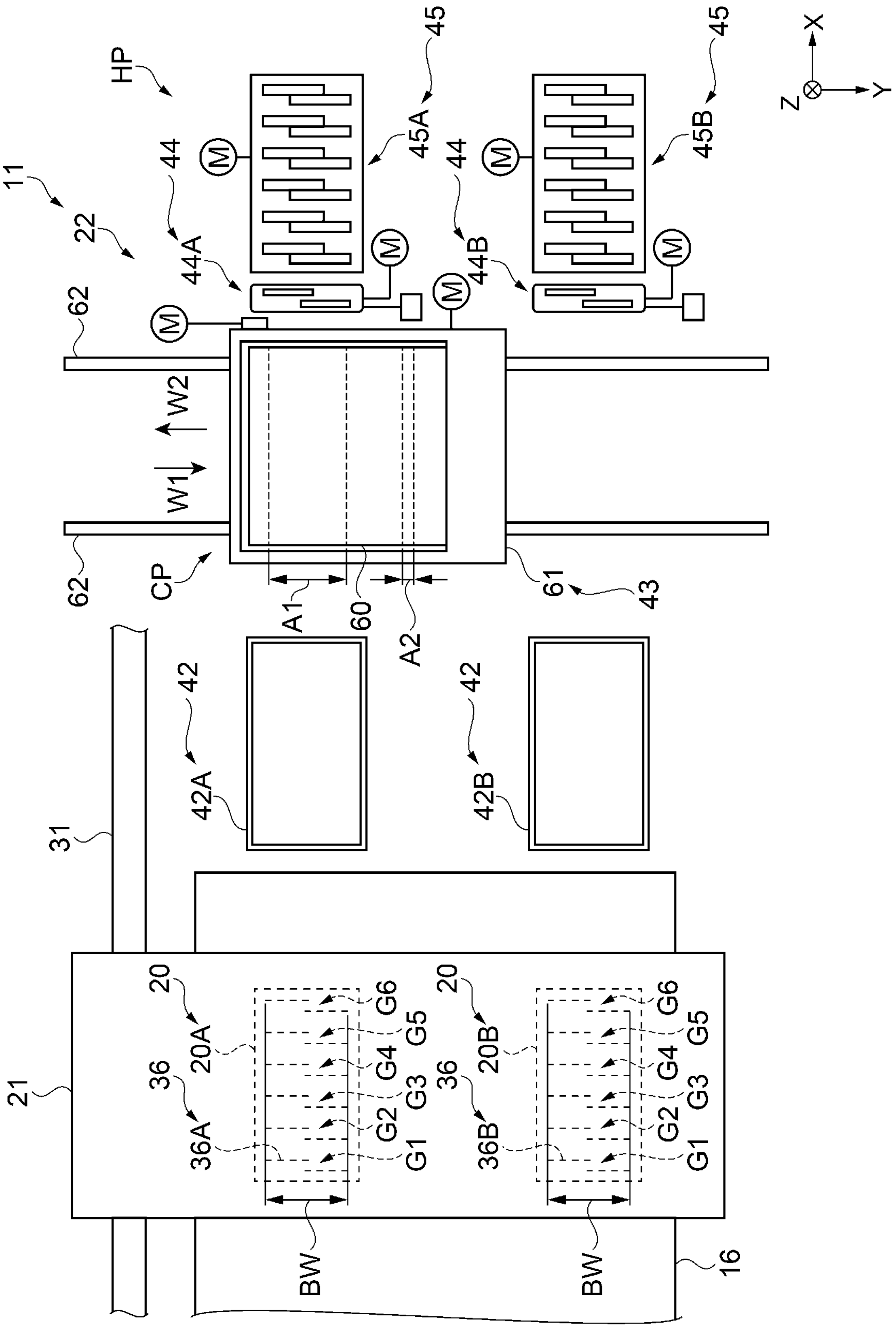
FIG. 14 is a schematic plan view of a maintenance unit in a second embodiment.

As shown in FIG. 14, the reaction liquid ejecting portion 20A and the ink discharge section 20B are provided in the carriage 21 at an interval in the Y axis direction. The reaction liquid ejecting portion 20A is provided in the −Y direction with respect to the ink discharge section 20B. The reaction liquid nozzles 36A and the ink nozzles 36B are examples of nozzles. The ink discharge section 20B is an example of a liquid ejecting portion.

The configurations of the reaction liquid ejecting portion 20A and the ink discharge section 20B are the same as those of the liquid ejecting portion 20 in first embodiment. Further, the reaction liquid is discharged from the reaction liquid nozzles 36A constituting the first nozzle group G1, the second nozzle group G2, the third nozzle group G3, the fourth nozzle group G4, the fifth nozzle group G5, and the sixth nozzle group G6 of the reaction liquid ejecting portion 20A.

The same ink as that of the liquid ejecting portion 20 according to the first embodiment is discharged from ink nozzles 36B constituting the first nozzle group G1, the second nozzle group G2, the third nozzle group G3, the fifth nozzle group G5, and the sixth nozzle group G6 of the ink discharge section 20B. For example, white ink is discharged from the ink nozzles 36B constituting the fourth nozzle group G4.

The maintenance unit 22 in this embodiment has a liquid collection device 43, a suction device 44, and a capping device 45 arranged in the width direction X. The configuration of the liquid collection device 43 is the same as that of the liquid collection device 43 in the first embodiment except that the length of the rails 62 and the distance over which the case 61 reciprocates along the Y axis are changed in accordance with the reaction liquid ejecting portion 20A and the ink discharge section 20B.

The standby position of the case 61 in the present embodiment is a position where the strip member 60 faces the reaction liquid ejecting portion 20A when the liquid ejecting portion 20 is located at the cleaning position CP. That is, the standby position of the case 61 is a receiving position corresponding to the reaction liquid ejecting portion 20A. When the case 61 is located at the receiving position corresponding to the reaction liquid ejecting portion 20A, the reaction liquid ejecting portion 20A is located at the position of the liquid ejecting portion 20 indicated by the two dot chain line in FIGS. 15 to 19, and when the case 61 is located at the receiving position corresponding to the ink discharge section 20B, the ink discharge section 20B is located at the position of the liquid ejecting portion 20 indicated by the two dot chain line in FIGS. 15 to 19.

The suction device 44 includes a suction device 44A corresponding to the reaction liquid ejecting portion 20A and a suction device 44B corresponding to the ink discharge section 20B. The configuration of the suction device 44A, 44B is the same as that of the suction device 44 in the first embodiment. The capping device 45 includes a capping device 45A corresponding to the reaction liquid ejecting portion 20A and a capping device 45B corresponding to the ink discharge section 20B. The configurations of the capping devices 45A, 45B are the same as that of the capping device 45 in the first embodiment.

In addition, the maintenance unit 22 may include a flushing device 42 that performs flushing every predetermined time during printing. In this case, the flushing device 42 includes a reaction liquid receiving device 42A for receiving the reaction liquid discharged as flushing by the reaction liquid ejecting portion 20A, and an ink receiving device 42B for receiving the ink discharged as flushing by the ink discharge section 20B.

Figure 15:
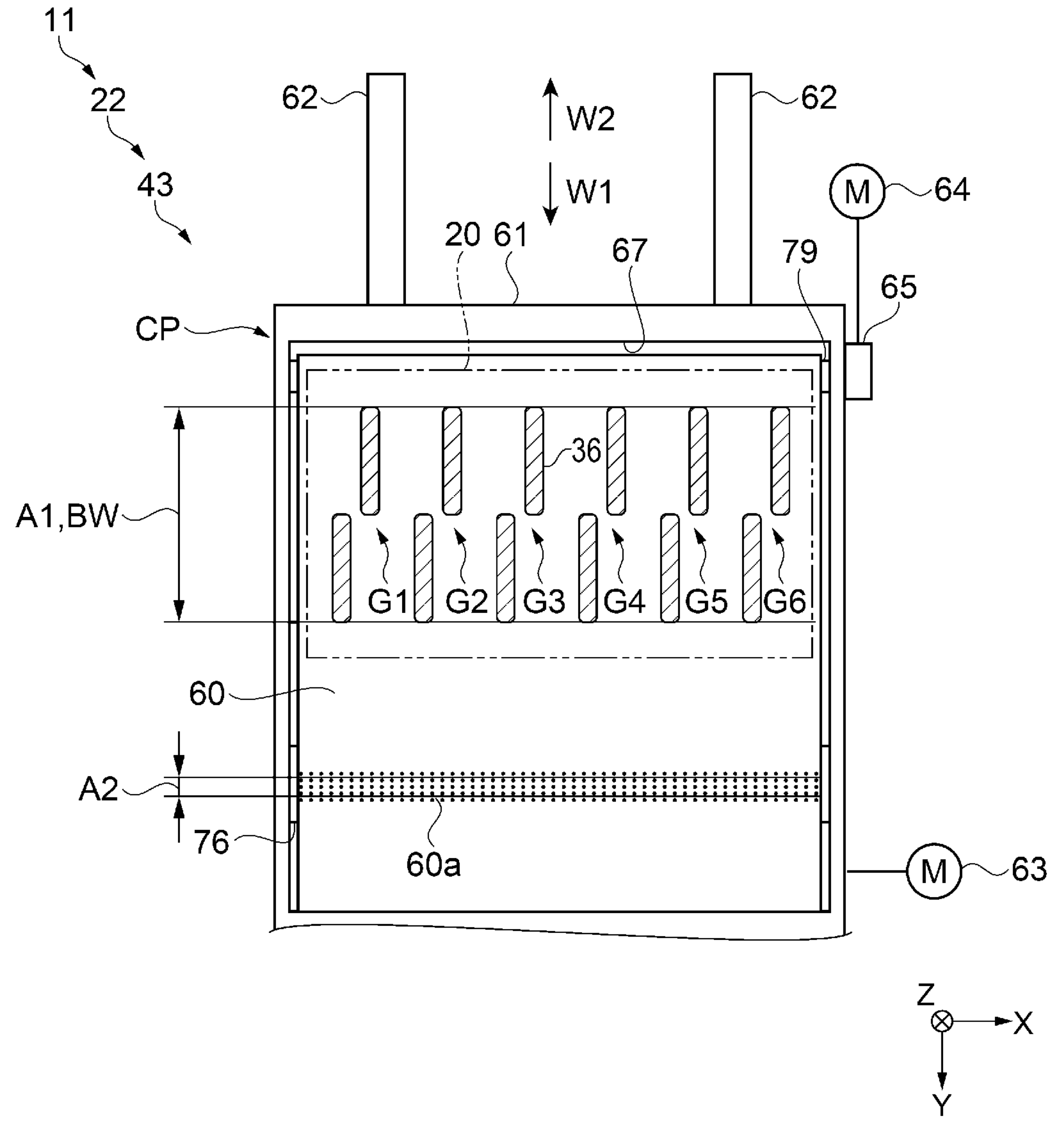
FIG. 15 is a schematic plan view showing liquid discharged to a receiving region A1 in the second embodiment.
Figure 16:
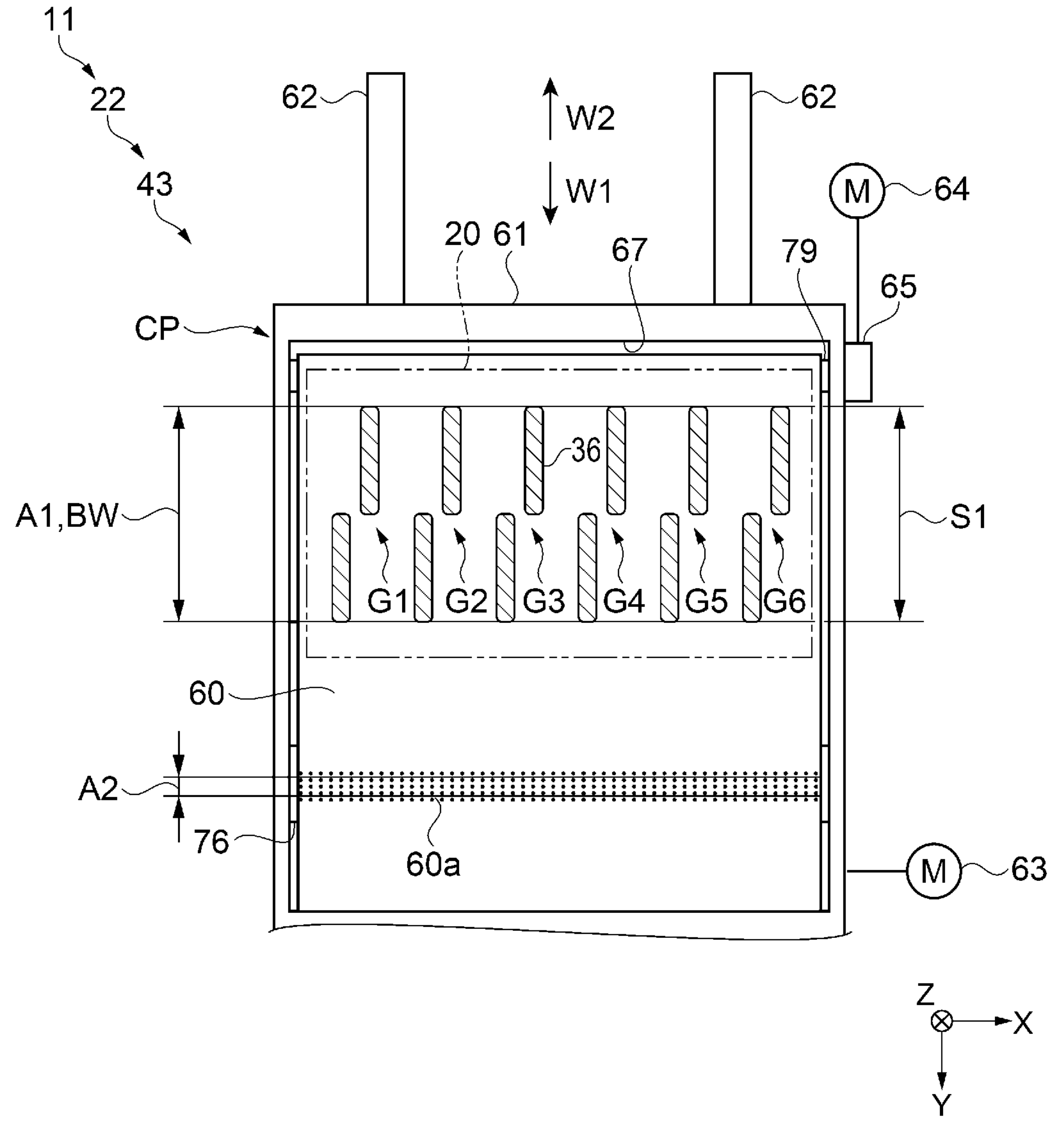
FIG. 16 is a schematic plan view showing a reaction liquid supplied to a supply region S1 in the second embodiment.

Next, a case will be described in which the control section 29 performs pressure cleaning on the ink discharge section 20B as maintenance of the liquid ejecting apparatus 11. As shown in FIG. 15, when performing pressure cleaning, the control section 29 moves the case 61 from the standby position shown in FIG. 14 to a receiving position corresponding to the ink discharge section 20B, which is in the +Y direction. Thereafter, the control section 29 moves the liquid ejecting portion 20 to the cleaning position CP and then stops the liquid ejecting portion 20. As a result, the receiving region A1 of the strip member 60 faces the region BW of the ink discharge section 20B.

The control section 29 controls the liquid supply device 23 to supply pressurized liquid to the ink nozzles 36B and discharge ink from the ink nozzles 36B. As shown by hatching in FIG. 15, the ink discharged as waste liquid from the ink nozzles 36B by the pressure cleaning is received by the receiving region A1 set in the strip member 60.

After performing pressure cleaning on the ink discharge section 20B, the control section 29 drives the wiping motor 63 to rotate in the reverse direction while keeping the liquid ejecting portion 20 stopped, and moves the case 61 in the second wiping direction W2. That is, the control section 29 performs wiping by bringing the contact region A2 of the strip member 60 into contact with the nozzle face 40 of the ink discharge section 20B, and collects the ink that was discharged by the pressure cleaning and that remained on the nozzle face 40 in the contact region A2.

The control section 29 moves the case 61 in the second wiping direction W2 also after the wiping of the ink discharge section 20B is performed, and stops the case 61 at the receiving position corresponding to the reaction liquid ejecting portion 20A. Then, as shown by hatching in FIG. 16, the control section 29 discharges the reaction liquid from the reaction liquid nozzles 36A constituting the first nozzle group G1 to the sixth nozzle group G6 of the reaction liquid ejecting portion 20A to a region overlapping with the region where the ink was discharged by the pressure cleaning of the ink discharge section 20B. In other words, the reaction liquid ejecting portion 20A supplies the reaction liquid from the reaction liquid nozzles 36A to the strip member 60 after ink is discharged from the ink nozzles 36B of the ink discharge section 20B to the receiving region A1.

When a region of the strip member 60 to which the reaction liquid is discharged from the reaction liquid nozzle 36A of the reaction liquid ejecting portion 20A is referred to as a supply region S1, the supply region S1 is positioned in the receiving region A1. The reaction liquid nozzles 36A of the reaction liquid ejecting portion 20A are an example of a supply portion RLS capable of supplying a reaction liquid having an ink curing component to the strip member 60. In this case, it can be said that the supply portion RLS includes the reaction liquid ejecting portion 20A. Alternatively, it can be said that the supply portion RLS includes the reaction liquid nozzles 36A included in the reaction liquid ejecting portion 20A.

After the reaction liquid is discharged from the reaction liquid nozzles 36A of the reaction liquid ejecting portion 20A to the receiving region A1 of the strip member 60, the control section 29 moves the case 61 to the receiving position corresponding to the ink discharge section 20B. Then, the control section 29 performs flushing in which ink is discharged from the ink nozzles 36B of the ink discharge section 20B to the receiving region A1 of the strip member 60.

In addition, in a case where the maintenance unit 22 includes the flushing device 42, the flushing from the ink discharge section 20B performed after wiping of the ink discharge section 20B may be performed toward the ink receiving device 42B of the flushing device 42. In this case, while moving the case 61 toward the receiving position corresponding to the reaction liquid ejecting portion 20A after wiping is performed on the ink discharge section 20B, the control section 29 moves the liquid ejecting portion 20 to a position facing the ink receiving device 42B. Then, the control section 29 causes flushing in which ink is discharged from the ink nozzles 36B of the ink discharge section 20B to the ink receiving device 42B of the flushing device 42.

In addition, the supply of the reaction liquid from the reaction liquid nozzle 36A of the reaction liquid ejecting portion 20A to the supply region S1 of the strip member 60 may be performed before performing the pressure cleaning on the ink discharge section 20B. In this case, the control section 29 moves the liquid ejecting portion 20 to the cleaning position CP while the case 61 is at the standby position, and causes the reaction liquid to be discharged from the reaction liquid nozzles 36A of the reaction liquid ejecting portion 20A to the supply region S1 indicated by hatching in FIG. 16. Afterward, the control section 29 performs pressure cleaning on the ink discharge section 20B.

In the wiping the ink discharge section 20B, when the amount of the ink collected in the contact region A2 of the strip member 60 is large, the ink collected in the contact region A2 may wet the strip member 60 and spread upstream in the D direction, and the region of the strip member 60 where the ink wet and spread may contact one of the reaction liquid ejecting portion 20A or the ink discharge section 20B. In this case, the reaction liquid may be supplied to the contact region A2 where the ink collected by wiping of the ink discharge section 20B.

Specifically, after wiping of the ink discharge section 20B is performed, the control section 29 causes the winding portion 72 to wind the strip member 60, to move the contact region A2 where ink collected by wiping in the D direction. Then, the control section 29 positions the contact region A2 where ink collected by wiping into the receiving region A1.

Thereafter, for example, the control section 29 moves the case 61 to the standby position, and discharges the reaction liquid from the reaction liquid nozzles 36A of the reaction liquid ejecting portion 20A to the supply region S2. Alternatively, the control section 29 may discharge the reaction liquid from the reaction liquid nozzles 36A of the reaction liquid ejecting portion 20A to the supply region S3.

In this case, for example, the contact region A2 which was moved into the receiving region A1 and in which the ink collected by wiping the ink discharge section 20B is referred to as a collection region CRB, and a region in the strip member 60 set as the contact region A2 to be used in the next wiping is referred to as the wiping region WR. At this time, the reaction liquid nozzles 36A of the reaction liquid ejecting portion 20A supply the reaction liquid to the supply region S2 or to the supply region S3 in the strip member 60 between the wiping region WR and the position in the collection region CRB farthest from the wiping region WR.

Next, a case where the control section 29 performs flushing as maintenance of the liquid ejecting portion 20 will be described. For example, when the reaction liquid ejecting portion 20A is to perform flushing, the control section 29 moves the liquid ejecting portion 20 to the cleaning position CP while the case 61 is in the standby position, and discharges the reaction liquid from the reaction liquid nozzles 36A of the reaction liquid ejecting portion 20A to the supply region S1 indicated by hatching in FIG. 16.

Afterward, when flushing is performed on the ink discharge section 20B, the control section 29 moves the case 61 to the receiving position corresponding to the ink discharge section 20B, and then moves the liquid ejecting portion 20 to the cleaning position CP. Then, the control section 29 causes the ink to be discharged from the ink nozzle 36B of the ink discharge section 20B to a receiving region A1 indicated by hatching in FIG. 15.

At this time, the control section 29 does not cause the winding portion 72 to perform the winding operation of the strip member 60 between the flushing in which the reaction liquid is discharged from the reaction liquid nozzles 36A of the reaction liquid ejecting portion 20A and the flushing in which the ink is discharged from the ink nozzles 36B of the ink discharge section 20B. In this case, the operation in which the reaction liquid ejecting portion 20A discharges the reaction liquid to the strip member 60 by flushing corresponds to an operation in which the reaction liquid ejecting portion 20A supplies the reaction liquid from the reaction liquid nozzles 36A to the supply region S1, which overlaps the receiving region A1 of the strip member 60, before the ink discharge section 20B discharges the ink to the receiving region A1 by flushing.

Figure 17:
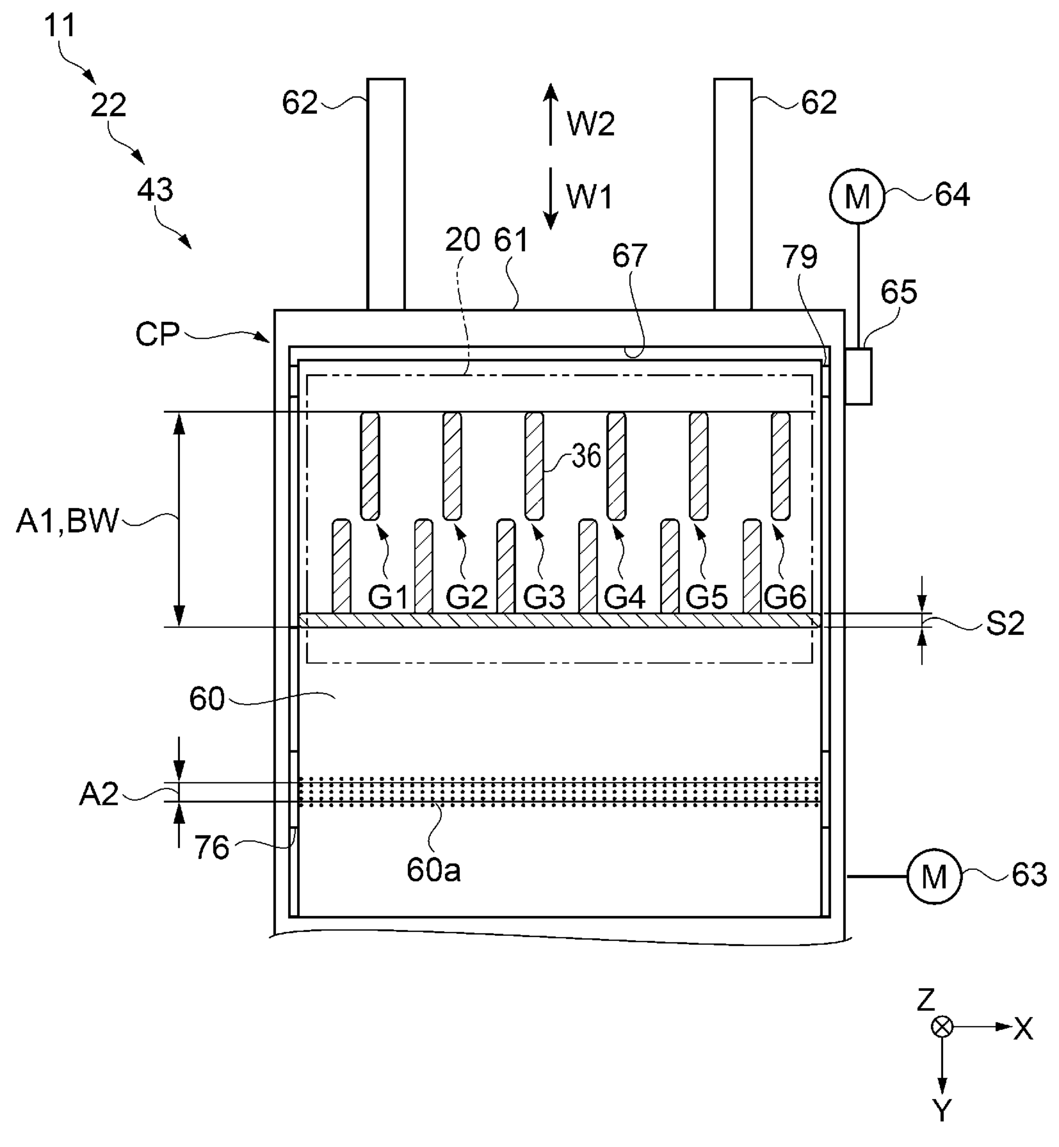
FIG. 17 is a schematic plan view showing reaction liquid supplied to a supply region S2 in the second embodiment.

In the present embodiment, the supply of the reaction liquid to the strip member 60 may be performed to the supply region S2 shown by hatching in FIG. 17 instead of to the supply region S1. The supply region S2 of this embodiment is the same as the supply region S2 of the first embodiment. When the reaction liquid is supplied to the supply region S2, for example, the control section 29 discharges the reaction liquid from any one of the reaction liquid nozzles 36A constituting the first nozzle group G1 to the sixth nozzle group G6 to the supply region S2 while moving the liquid ejecting portion 20 in the X axis direction in a state where the case 61 is located at the standby position.

At this time, the reaction liquid is discharged to the supply region S2 from some reaction liquid nozzles 36A facing the supply region S2, from among the reaction liquid nozzles 36A constituting the first nozzle group G1 to the sixth nozzle group G6. Some reaction liquid nozzles 36A facing the supply region S2 are nozzles 36 constituting the +Y direction side of the first nozzle group G1 to the sixth nozzle group G6. Alternatively, when the reaction liquid is supplied to the supply region S2, the reaction liquid may be discharged to the supply region S2 from one nozzle at an +Y direction end from among the nozzles 36 constituting the +Y direction side of the first nozzle group G1 to the sixth nozzle group G6.

Figure 18:
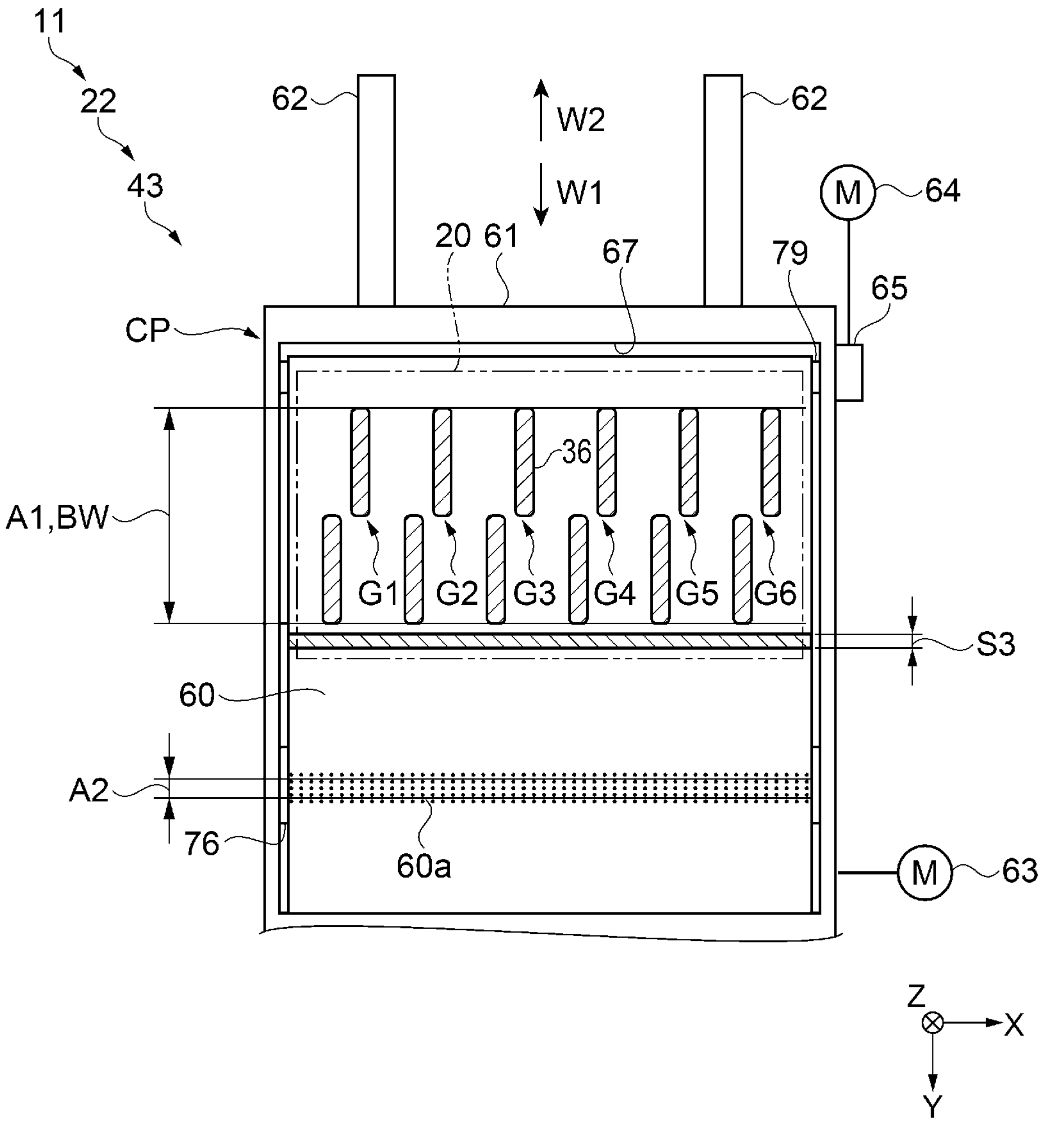
FIG. 18 is a schematic plan view showing reaction liquid supplied to a supply region S3 in the second embodiment.

Further, instead of in the supply region S1, the reaction liquid may be supplied to the strip member 60 in a supply region S3 indicated by hatching in FIG. 18. The supply region S3 of this embodiment is the same as the supply region S3 of the first embodiment. In a case where the reaction liquid is supplied to the supply region S3, for example, the control section 29 drives the wiping motor 63 and moves the case 61 from the standby position to a position in the +Y direction. As a result, the supply region S3 is set in the downstream region of the strip member 60. Then, while moving the liquid ejecting portion 20 in the X axis direction, the control section 29 discharges the reaction liquid to the supply region S3 from any one of the reaction liquid nozzles 36A constituting the first nozzle group G1 to the sixth nozzle group G6, in the same way as in the case of supplying the reaction liquid to the supply region S2.

Figure 19:
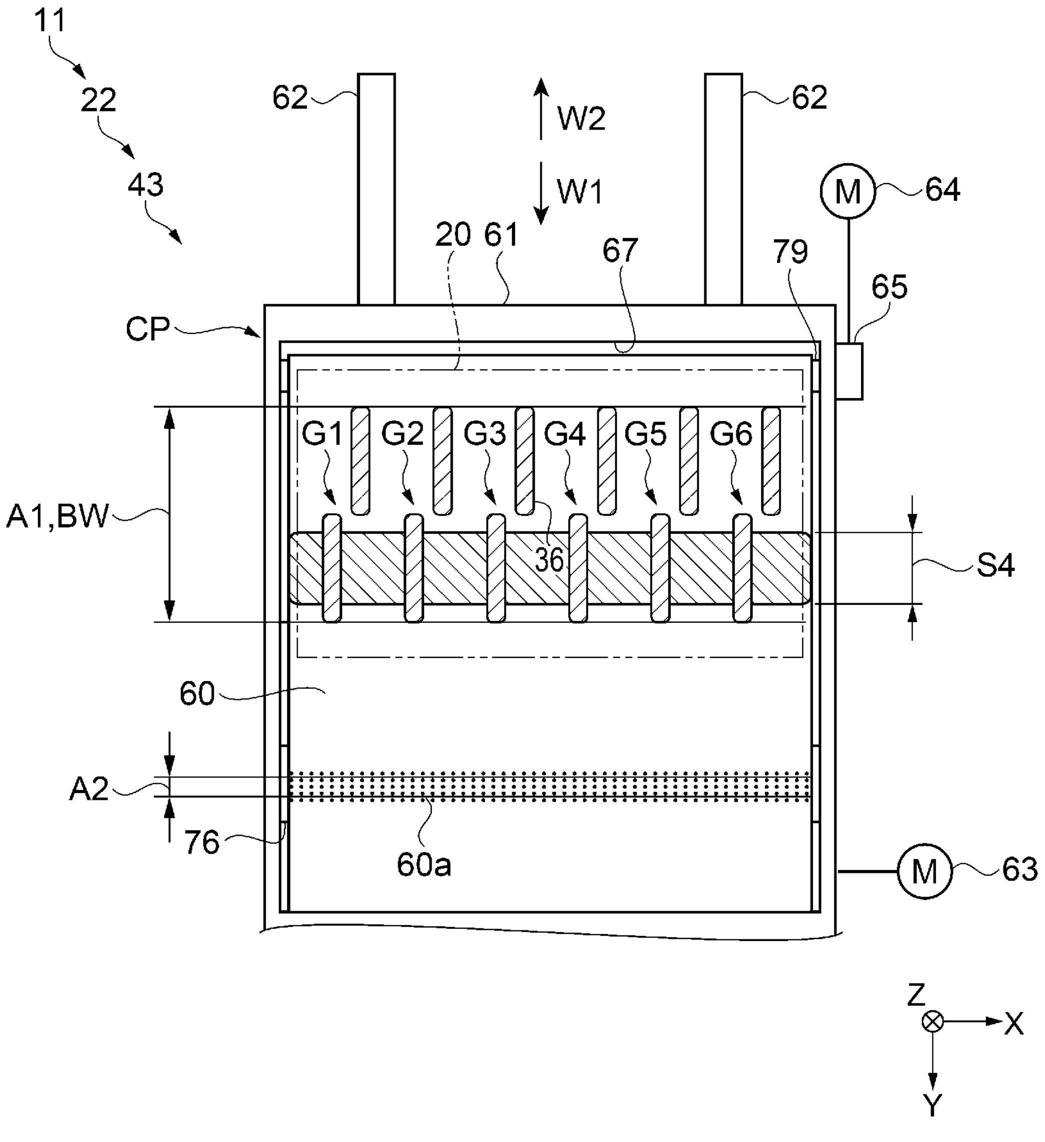
FIG. 19 is a schematic plan view showing reaction liquid supplied to a supply region S4 in the second embodiment.

In the present embodiment, the supply of the reaction liquid to the strip member 60 may be performed to the supply region S4 shown by hatching in FIG. 19 in place of to the supply region S1. For example, a case will be described in which the reaction liquid is supplied to the supply region S4 before the ink is discharged from the ink nozzles 36B of the ink discharge section 20B to the receiving region A1 indicated by hatching in FIG. 19.

In this case, the control section 29 moves the liquid ejecting portion 20 to the cleaning position CP while the case 61 is in the standby position. Then, the control section 29 moves the case 61 from the standby position in the first wiping direction W1, and brings the contact region A2 of the strip member 60 into contact with the reaction liquid nozzle region including the openings of the reaction liquid nozzles 36A in the nozzle face 40 of the reaction liquid ejecting portion 20A. Alternatively, the control section 29 performs wiping of the reaction liquid ejecting portion 20A by the strip member 60. As a result, the reaction liquid adhering to the reaction liquid nozzle region of the reaction liquid ejecting portion 20A is collected in the contact region A2.

Alternatively, the control section 29 controls the liquid supply device 23 to supply the reaction liquid to the reaction liquid nozzles 36A of the reaction liquid ejecting portion 20A so that the reaction liquid bulges out from the reaction liquid nozzles 36A. In this state, the control section 29 may bring the contact region A2 of the strip member 60 into contact with the reaction liquid nozzle region of the reaction liquid ejecting portion 20A. As a result, the reaction liquid bulging out from the reaction liquid nozzle 36A of the reaction liquid ejecting portion 20A is collected in the contact region A2.

Then, the control section 29 causes the winding portion 72 to wind up the strip member 60, and moves the contact region A2, where the reaction liquid was collected, to the position of the supply region S4, which is downstream in the direction D. In this case, after the reaction liquid is collected by contact with the reaction liquid nozzle region, the contact region A2 moved to a position within the receiving region A1 can be said to be a supply region S4 for supplying the reaction liquid to the receiving region A1 in which the ink is discharged.

Afterward, the control section 29 moves the case 61 to the receiving position with respect to the ink discharge section 20B, and for example, performs pressurized cleaning with respect to the ink discharge section 20B by ejecting ink from the ink nozzles 36B of the ink discharge section 20B to the receiving region A1 of the strip member 60. In other words, the strip member 60 is provided so that the supply region S4 can come into contact with a reaction liquid nozzle region including the openings of the reaction liquid nozzles 36A, and after the supply region S4 contacts the reaction liquid nozzle region, the ink is discharged from the ink discharge section 20B to the receiving region A1.

As described above, according to the liquid ejecting apparatus 11 according to the second embodiment, the following effects can be obtained.

The liquid ejecting apparatus 11 further includes the reaction liquid ejecting portion 20A having nozzles 36 capable of ejecting reaction liquid, and the supply portion RLS includes the reaction liquid ejecting portion 20A. According to this configuration, the reaction liquid can be supplied to the strip member 60 by utilizing the reaction liquid ejecting portion 20A.

When nozzles 36 for ejecting reaction liquid are referred to as reaction liquid nozzles 36A, the strip member 60 is provided so that the supply region S4 can be brought into contact with the reaction liquid nozzle region including openings of the reaction liquid nozzles 36A, and after the supply region S4 is brought into contact with the reaction liquid nozzle region, ink is discharged from the ink discharge section 20B to the receiving region A1. According to this configuration, by bringing the strip member 60 into contact with the reaction liquid nozzle region, the reaction liquid can be supplied from the supply portion RLS to the supply region S4 of the strip member 60.

In a state where the reaction liquid bulges out from the reaction liquid nozzle 36A, the supply region S4 of the strip member 60 is brought into contact with the reaction liquid nozzle region. As a result, the amount of the reaction liquid supplied to the strip member 60 can be increased.

The liquid ejecting apparatus 11 according to the embodiment of the present disclosure basically has the configuration as described above, but needless to say a partial change, omission, or the like of the configuration can be made without departing from the scope of the present disclosure. In addition, the above-described embodiments and other embodiments described below can be implemented in combination with each other within a range that does not technically conflict. Other embodiments will be described below.

Figure 20:
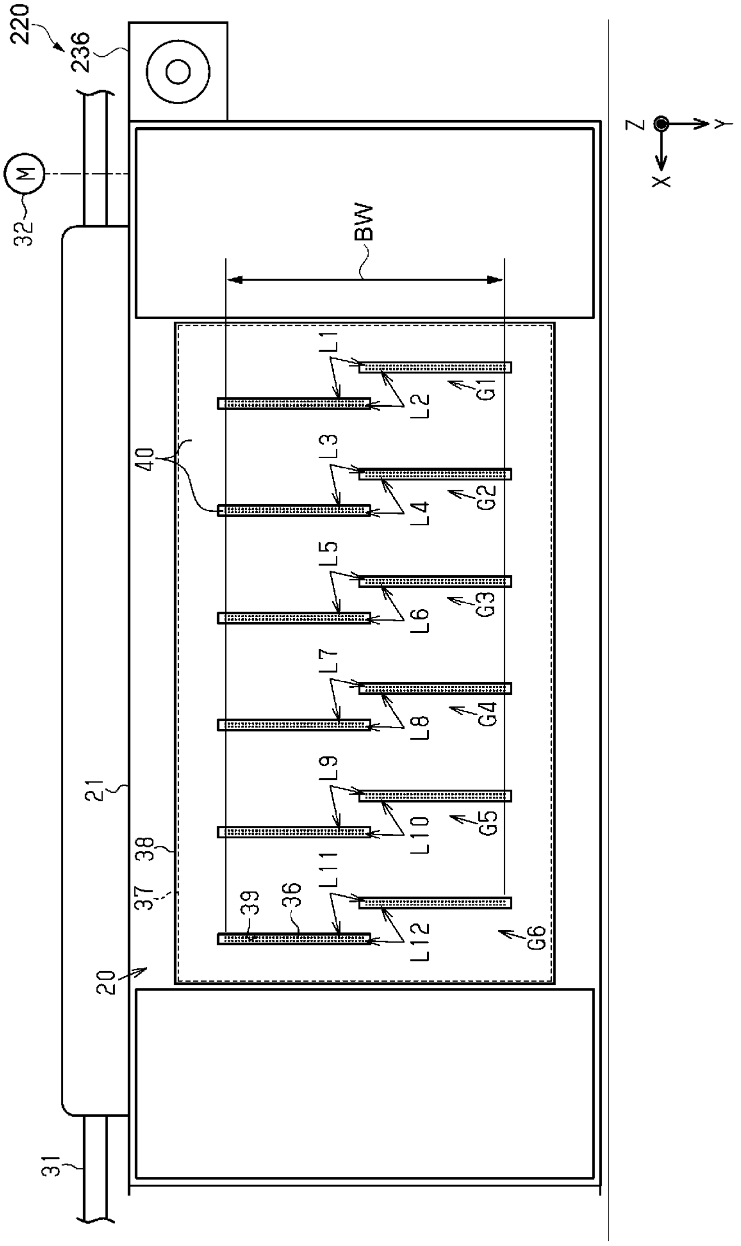
FIG. 20 is a schematic bottom view of a liquid ejecting portion and a carriage according to another embodiment.

In the embodiments described above, as shown in FIG. 20, the liquid ejecting apparatus 11 may include a reaction liquid injection section 220 capable of ejecting a reaction liquid. The reaction liquid injection section 220 has injection nozzles 236 for injecting the reaction liquid. The reaction liquid injection section 220 is provided in the carriage 21 so as to be able to supply the reaction liquid to either the strip member 60 or to the medium 14. The reaction liquid injection section 220 is an example of a supply portion RLS capable of supplying a reaction liquid, having a component that cures ink, to the strip member 60. In this case, the liquid supply device 23 supplies the reaction liquid to the reaction liquid injection section 220. In this case, the liquid ejecting portion 20 according to the first embodiment may not discharge the reaction liquid onto the strip member 60 from the nozzles 36 constituting the fourth nozzle group G4. In this case, the liquid ejecting portion 20 of the second embodiment may not discharge the reaction liquid from the reaction liquid nozzles 36A of the reaction liquid ejecting portion 20A to the strip member 60.

In the embodiments described above, the first nozzle group G1 to the sixth nozzle group G6 included in the liquid ejecting portion 20 may not extend in the Y direction. In addition, the plurality of the first nozzle group G1 to the sixth nozzle group G6 may not be arranged at intervals in the X direction. For example, the first nozzle group G1 to the sixth nozzle group G6 included in the liquid ejecting portion 20 may extend in the X direction over the width of the medium 14. Further, a plurality of first nozzle groups G1 to sixth nozzle groups G6 may be arranged at intervals in the Y direction. In this case, the liquid ejecting portion 20 may be a so-called line head, and the liquid ejecting apparatus 11 may be a line head printer.

In the embodiments described above, the liquid collection device 43 may not include the unwinding portion 70 and the winding portion 72. In this case, for example, the case 61 of the liquid collection device 43 may move in the Y axis direction in a state in which the strip member 60 is supported in a flat plate shape along the X-Y plane. Further, the case 61 may support the strip member 60 so that the strip member 60 can be brought into contact with the nozzle face 40 of the liquid ejecting portion 20.

In the embodiments described above, the liquid ejecting apparatus 11 may not perform printing by the liquid ejecting portion 20 ejecting ink onto the medium 14 to which the supply portion RLS has supplied the reaction liquid. In this case, for example, in the liquid ejecting apparatus 11, the supply portion RLS may supply the reaction liquid to the medium 14 on which the liquid ejecting portion 20 has discharged ink to perform printing. Alternatively, when the liquid ejecting portion 20 performs printing by ejecting ink to the medium 14, the liquid ejecting apparatus 11 may not supply the reaction liquid to the medium 14.

In the second embodiment, the reaction liquid ejecting portion 20A may not be provided in the −Y direction with respect to the ink discharge section 20B. In this case, for example, the reaction liquid ejecting portion 20A may be provided in the +Y direction with respect to the ink discharge section 20B. Further, for example, the reaction liquid ejecting portion 20A may be arranged at an interval in the X direction with respect to the ink discharge section 20B.

In the second embodiment, the liquid collection device 43 may move the case 61 from the standby position to the receiving position corresponding to the ink discharge section 20B so that the ink discharged from the ink nozzles 36B of the ink discharge section 20B is not received by the strip member 60. In this case, for example, the liquid collection device 43 may set the receiving position corresponding to the ink discharge section 20B to the standby position. In addition, for example, the liquid collection device 43 may have a downstream region extending in the Y direction in the transport path of the strip member 60 so as to be able to receive the reaction liquid discharged from the reaction liquid nozzles 36A of the reaction liquid ejecting portion 20A and the ink discharged from the ink nozzles 36B of the ink discharge section 20B in a state in which the case 61 is located at the standby position.

What is claimed is:

1. A liquid ejecting apparatus, comprising:

a liquid ejecting portion configured to perform printing by ejecting liquid from a nozzle to a medium;

a sheet-like absorbing member configured to absorb the liquid; and a supply portion configured to supply a reaction liquid having a component for curing the liquid to the absorbing member, wherein the absorbing member is provided to be settable with a receiving region that receives the liquid discharged as waste liquid from the nozzle and with a contact region that comes into contact with the liquid ejecting portion when collecting the liquid by coming into contact with the liquid ejecting portion and the supply portion supplies the reaction liquid to a supply region set in the absorbing member between the contact region and a position farthest from the contact region in the receiving region.

2. The liquid ejecting apparatus according to claim 1, further comprising:

an unwinding portion configured to hold the absorbing member in a state of being wound in a roll shape and a winding portion configured to move the absorbing member in a movement direction by winding up the absorbing member from the unwinding portion, wherein the contact region is set upstream of the receiving region in the movement direction.

3. The liquid ejecting apparatus according to claim 2, wherein the supply region is located within the receiving region.

4. The liquid ejecting apparatus according to claim 2, wherein the supply region is located between the receiving region and the contact region.

5. The liquid ejecting apparatus according to claim 1, wherein the supply portion supplies the reaction liquid to the absorbing member before the liquid ejecting portion discharges the liquid to the receiving region.

6. The liquid ejecting apparatus according to claim 1, wherein the supply portion supplies the reaction liquid to the absorbing member after the liquid ejecting portion discharges the liquid to the receiving region.

7. The liquid ejecting apparatus according to claim 1, wherein the supply portion includes a nozzle for ejecting the reaction liquid, and the nozzle for ejecting the reaction liquid is provided in the liquid ejecting portion.

8. The liquid ejecting apparatus according to claim 1, further comprising:

a reaction liquid ejecting portion having a nozzle for ejecting the reaction liquid, wherein the supply portion includes the reaction liquid ejecting portion.

9. The liquid ejecting apparatus according to claim 7, wherein assuming that the nozzle for ejecting the reaction liquid is a reaction liquid nozzle, the absorbing member is provided so that the supply region comes into contact with a reaction liquid nozzle region including an opening of the reaction liquid nozzle, and after the supply region comes into contact with the reaction liquid nozzle region, the liquid is discharged from the liquid ejecting portion to the receiving region.

10. The liquid ejecting apparatus according to claim 9, wherein in a state in which the reaction liquid bulges out from the reaction liquid nozzle, the supply region of the absorbing member contacts the reaction liquid nozzle region.

11. The liquid ejecting apparatus according to claim 2, wherein the printing is performed by causing the liquid ejecting portion to eject the liquid onto the medium to which the supply portion has supplied the reaction liquid.

* * * * *